US009865114B2

(12) United States Patent
Doi et al.

(10) Patent No.: US 9,865,114 B2
(45) Date of Patent: Jan. 9, 2018

(54) CASH MANAGEMENT METHOD AND A CASH MANAGEMENT SYSTEM

(71) Applicant: GLORY LTD., Himeji-shi, Hyogo-ken (JP)

(72) Inventors: Kazuhiro Doi, Himeji (JP); Minoru Higashiyama, Himeji (JP); Masatsugu Yokotani, Himeji (JP); Takayuki Kishibuchi, Himeji (JP)

(73) Assignee: GLORY LTD., Himeji-shi, Hyogo-ken (JP)

( * ) Notice: Subject to any disclaimer, the term of this patent is extended or adjusted under 35 U.S.C. 154(b) by 0 days.

(21) Appl. No.: 15/234,253

(22) Filed: Aug. 11, 2016

(65) Prior Publication Data
US 2016/0350993 A1 Dec. 1, 2016

Related U.S. Application Data

(63) Continuation of application No. 14/708,342, filed on May 11, 2015, now Pat. No. 9,437,065, which is a (Continued)

(30) Foreign Application Priority Data

Mar. 23, 2011 (JP) ................................. 2011-064593
Jul. 7, 2011 (JP) ................................. 2011-150871
Jul. 14, 2011 (JP) ................................. 2011-155976

(51) Int. Cl.
*G07D 7/00* (2016.01)
*G07D 1/06* (2006.01)
(Continued)

(52) U.S. Cl.
CPC ............... *G07D 1/06* (2013.01); *G06Q 20/20* (2013.01); *G06Q 20/204* (2013.01); (Continued)

(58) Field of Classification Search
CPC .. G07D 1/06; G07D 11/0087; G07D 11/0045; G07D 11/0048; G07D 11/0054;
(Continued)

(56) References Cited

U.S. PATENT DOCUMENTS 6,067,530 A * 5/2000 Brooks, Jr. .......... G06Q 20/206
194/206
7,401,034 B1 * 7/2008 Srivastava ............. G06Q 40/04
705/26.3
(Continued)

FOREIGN PATENT DOCUMENTS

JP 7-239980 A 9/1995
JP 2000-57440 A 2/2000
(Continued)

OTHER PUBLICATIONS

European Office Action (Application No. 12 761 063.2) (7 pages—dated Mar. 4, 2017).

*Primary Examiner* — Mark Beauchaine
(74) *Attorney, Agent, or Firm* — Renner, Kenner, Greive, Bobak, Taylor & Weber

(57) ABSTRACT

A settlement system includes a register having a reception unit that receives a manual input of information corresponding to at least a part of deposited money from a customer and a transmission unit that transmits a sum amount of money corresponding to the purchased product and manually input information manually input through the reception unit to a cash settlement device and the cash settlement device that calculates an amount of inserted money by recognizing and counting the inserted money, calculates a total amount of the money deposited from the customer by using the amount of the inserted money and the manually input information received from the register, calculates an amount of change based on the total amount of money and the sum amount of
(Continued)

money received from the register, and dispenses change money.

15 Claims, 19 Drawing Sheets

Related U.S. Application Data continuation of application No. 14/006,781, filed as application No. PCT/JP2012/056148 on Mar. 9, 2012, now Pat. No. 9,058,709.

(51) Int. Cl.
*G07G 1/12* (2006.01)
*G07F 19/00* (2006.01)
*G06Q 20/20* (2012.01)
*G07F 7/06* (2006.01)
*G07D 11/00* (2006.01)
*G07G 1/00* (2006.01)

(52) U.S. Cl.
CPC ....... *G06Q 20/209* (2013.01); *G07D 11/0087* (2013.01); *G07F 7/06* (2013.01); *G07F 19/202* (2013.01); *G07F 19/203* (2013.01); *G07G 1/0027* (2013.01); *G07G 1/12* (2013.01)

(58) Field of Classification Search
CPC ........... G07D 11/0057; G07D 11/0072; G07D 13/00; G06Q 20/204; G06Q 20/209; G06Q 10/0832; G06Q 10/0834; G06Q 10/08345; G06Q 20/08; G06Q 20/14; G06Q 20/202; G06Q 30/00; G06Q 30/08; G06Q 50/10; G06Q 50/30; G07F 19/202; G07F 19/203
See application file for complete search history.

(56) References Cited

U.S. PATENT DOCUMENTS

2004/0249718 A1  12/2004  Kuroda et al.
2010/0000837 A1   1/2010  Hokazono et al.

FOREIGN PATENT DOCUMENTS

JP        4194423 B2     10/2008
JP        2009-238150 A  10/2009

* cited by examiner

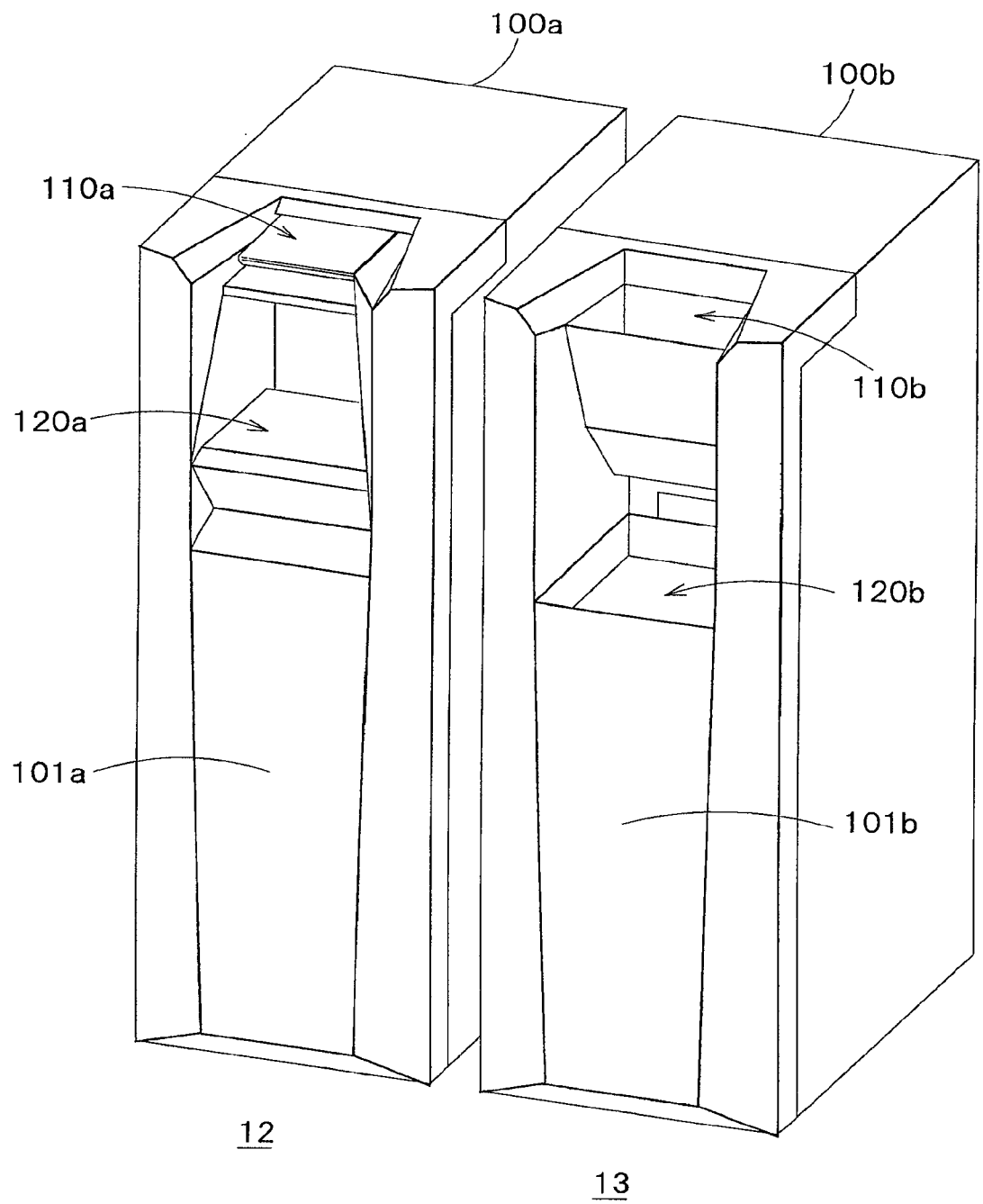
F I G. 2

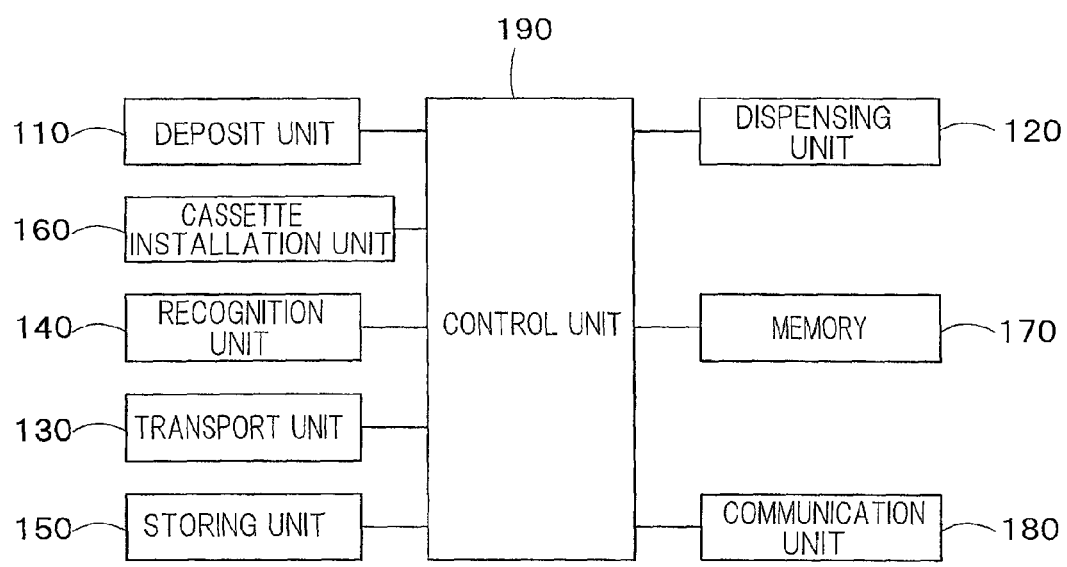
F I G. 3

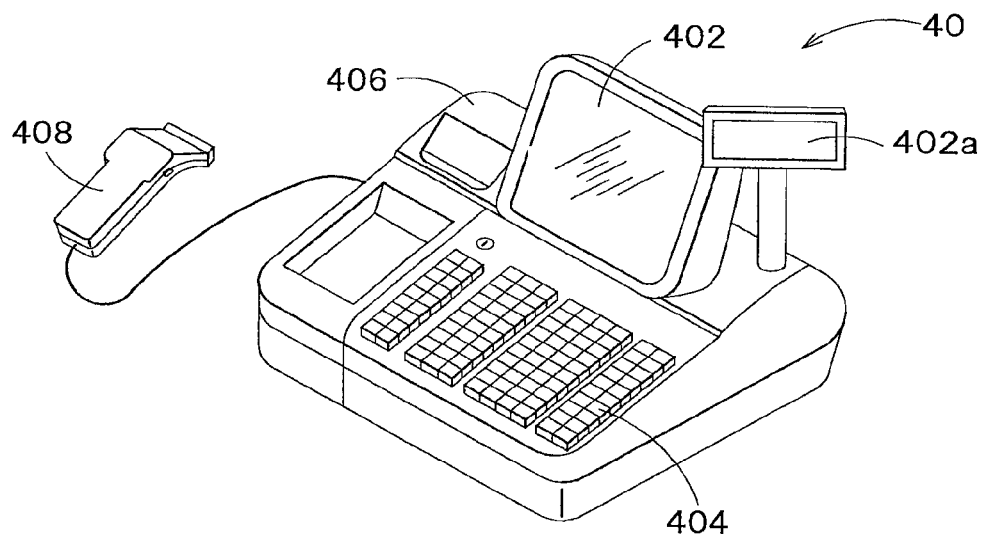
F I G. 6
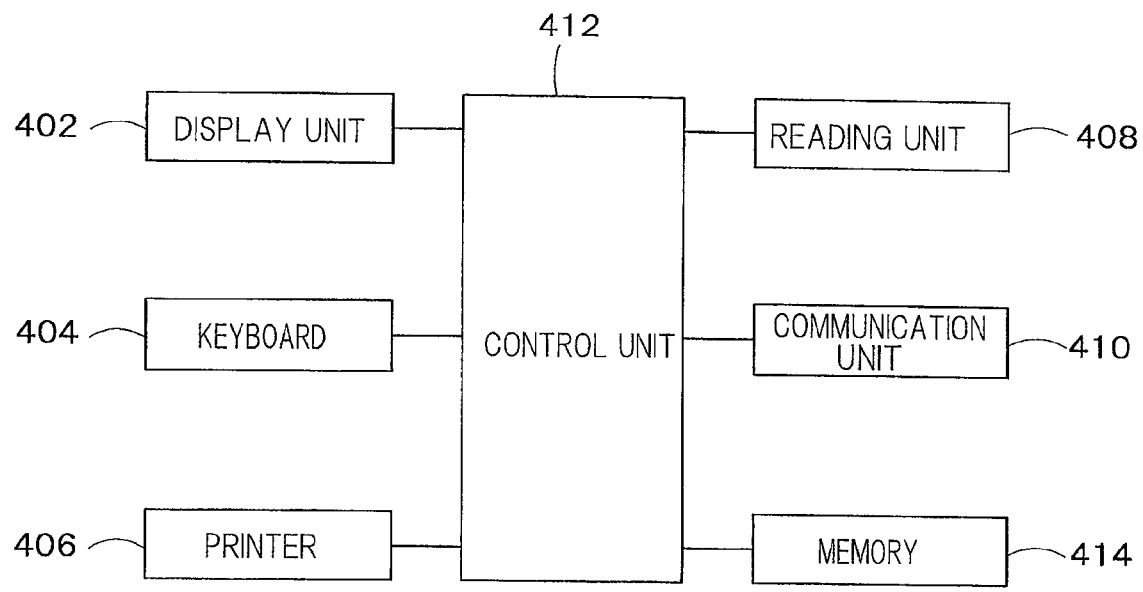
F I G. 7

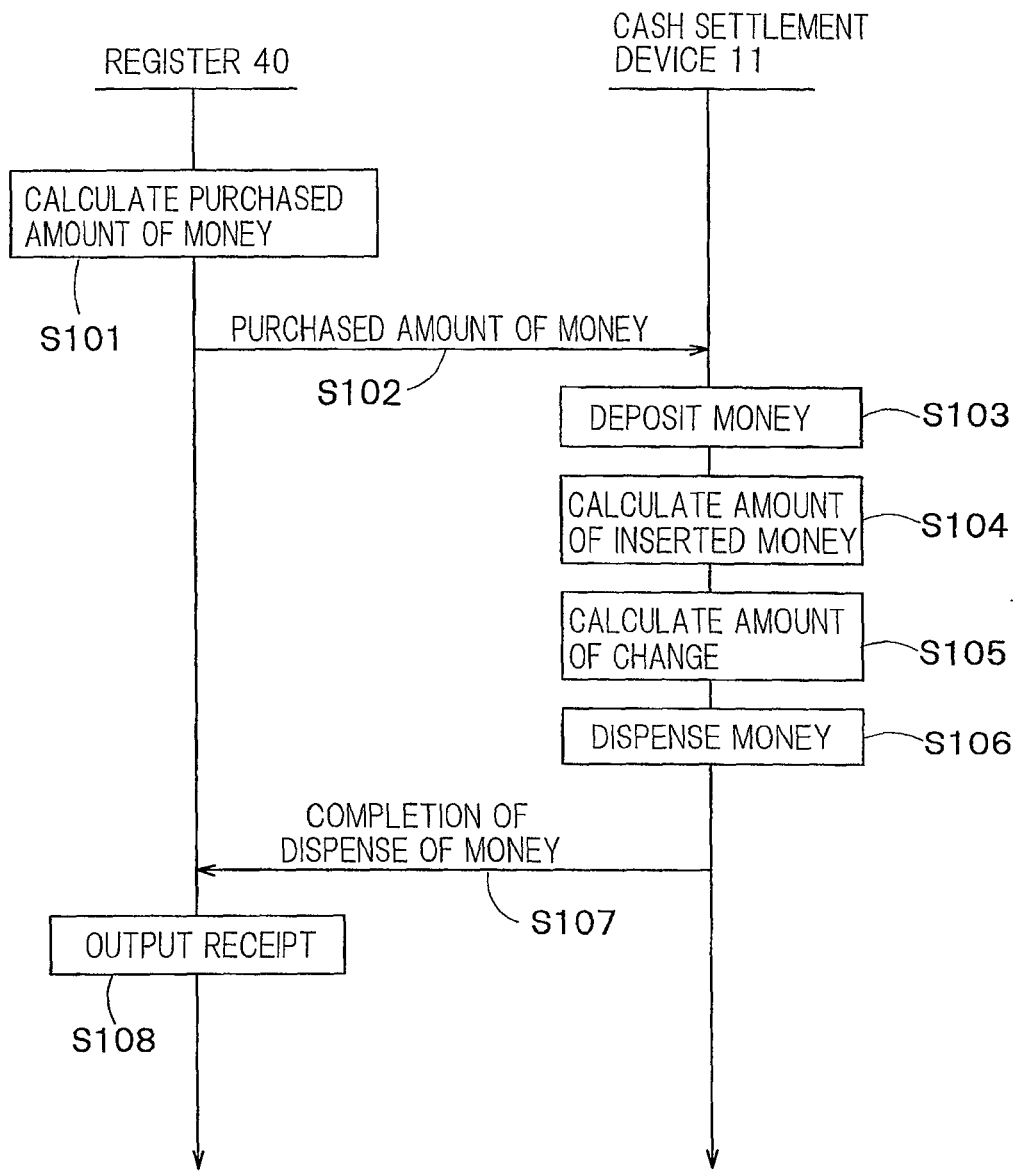
F I G. 8

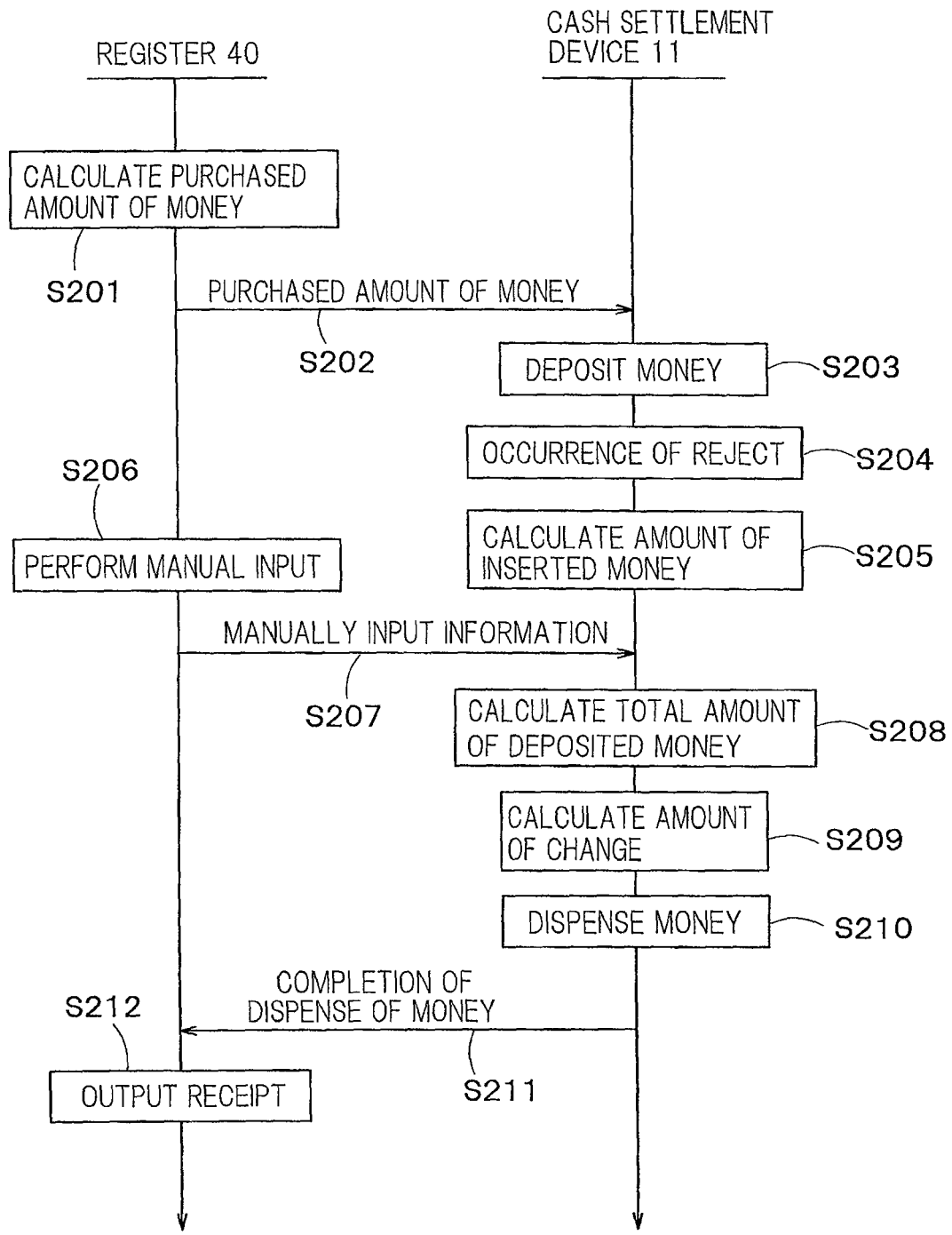
F I G. 9

F I G. 13
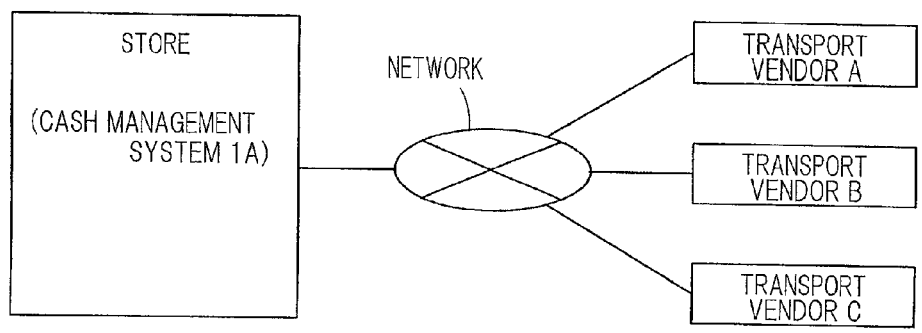
F I G. 14

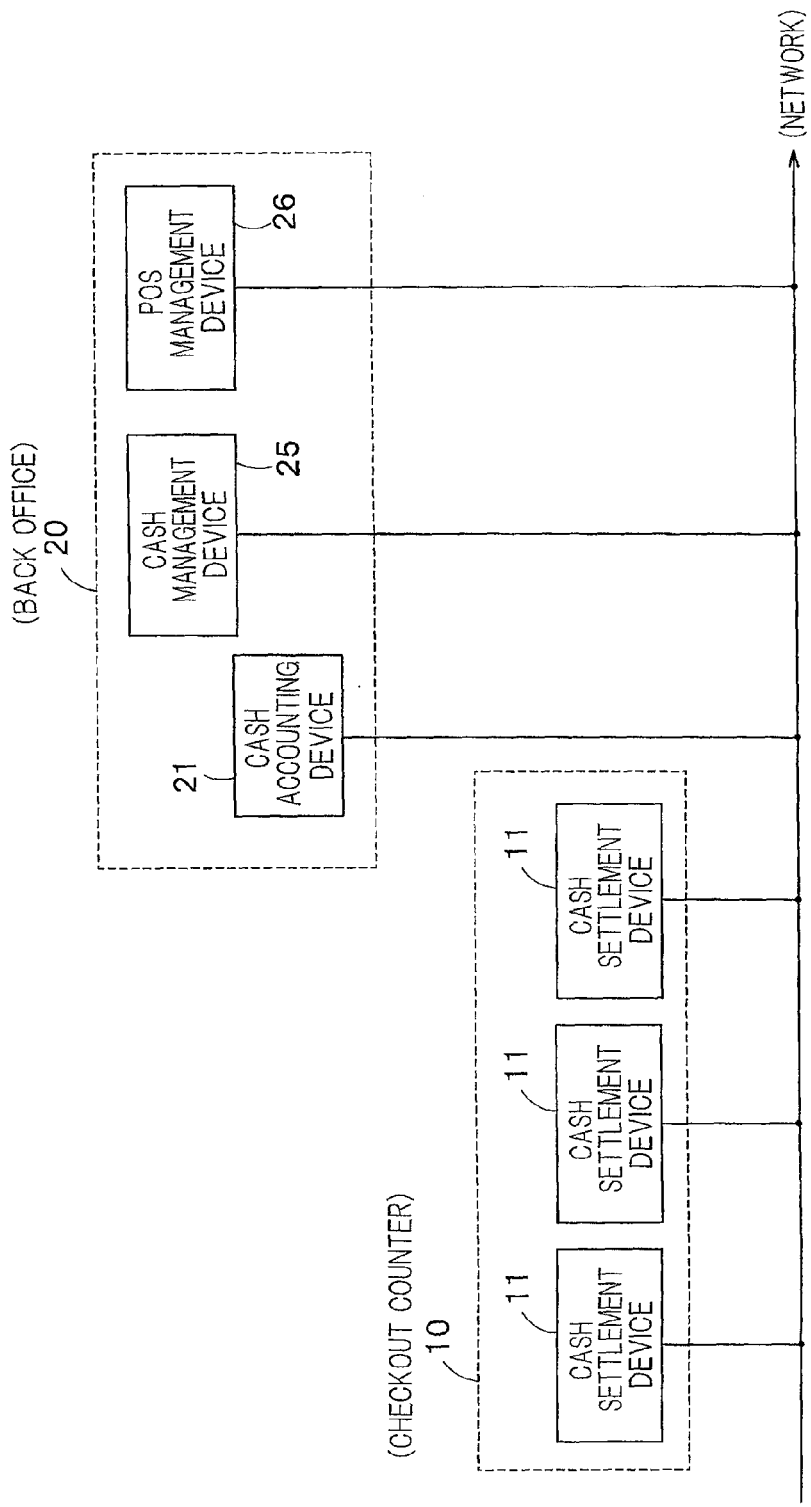
F I G. 15

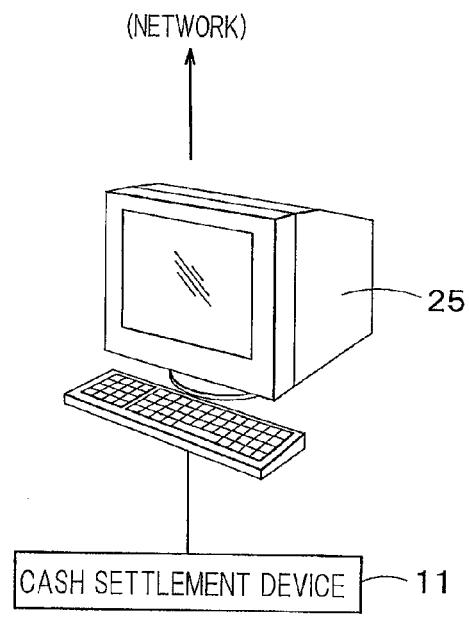
F I G. 16
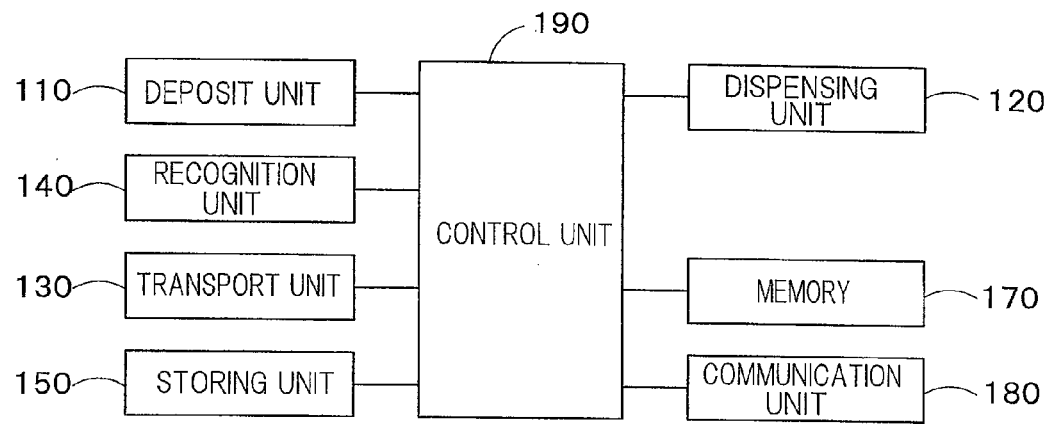
F I G. 17

CS → ☑ A COMPANY  COLLECTION COST: 25€
      COLLECTION DATE AND TIME:Jun.3.2011
                                    14:30

☐ B COMPANY  COLLECTION COST: 35€
      COLLECTION DATE AND TIME:Jun.3.2011
                                    17:30

☐ C COMPANY  COLLECTION COST: 90€
      COLLECTION DATE AND TIME:Jun.3.2011
                                    11:40

ASP

F I G. 23A

CS → ☑ A COMPANY  REPLENISHMENT COST: 30 €
      REPLENISHMENT DATE AND TIME:Jun.3.2011
                                        9:30

☐ B COMPANY  REPLENISHMENT COST: 90€
      REPLENISHMENT DATE AND TIME:Jun.3.2011
                                       12:30

☐ C COMPANY  REPLENISHMENT COST: 25€
      REPLENISHMENT DATE AND TIME:Jun.3.2011
                                       15:30

ASP

F I G. 23B

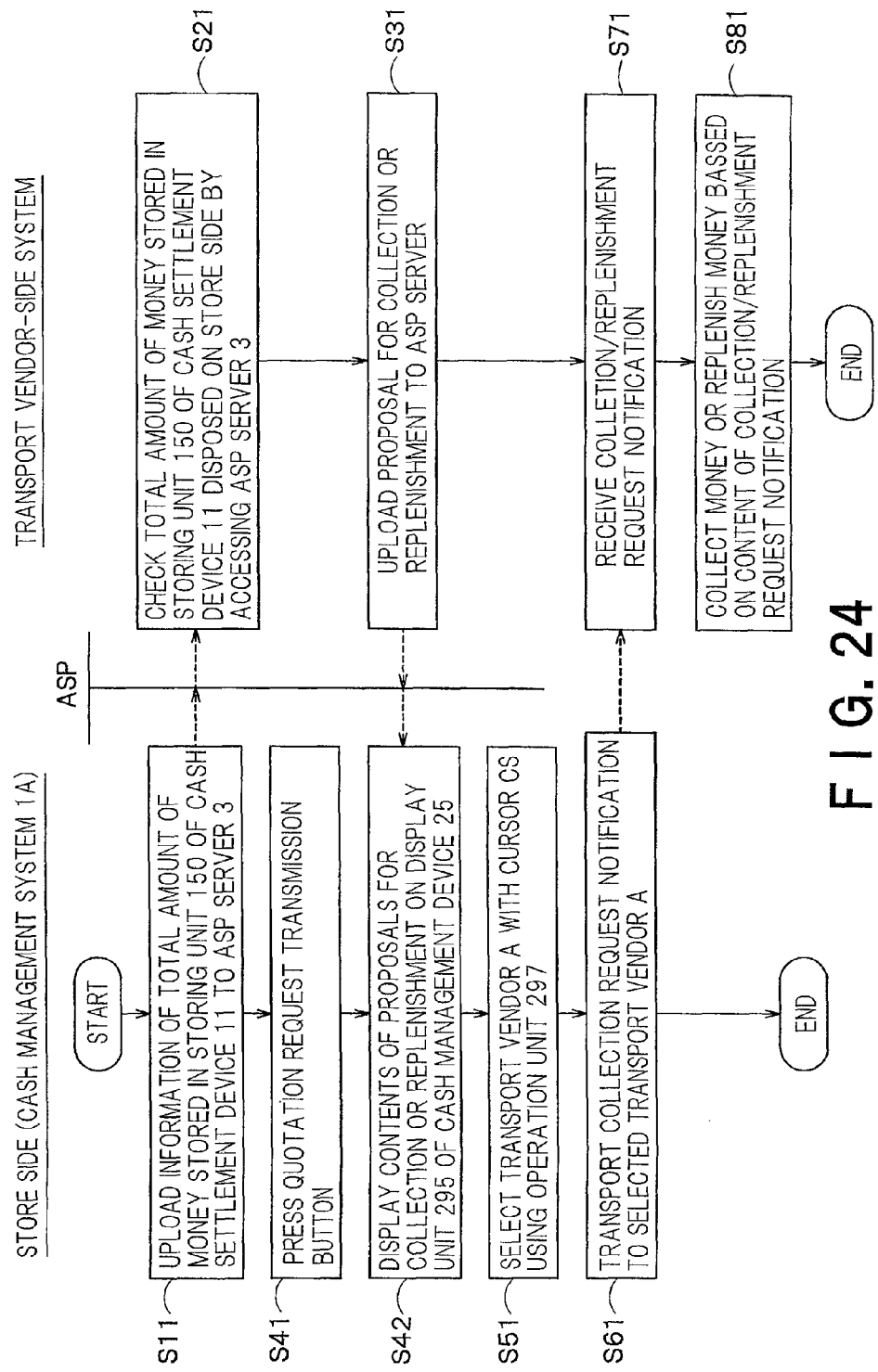
F I G. 24

CASH MANAGEMENT METHOD AND A CASH MANAGEMENT SYSTEM

CROSS-REFERENCE TO RELATED APPLICATIONS

This application is a continuation of U.S. patent application Ser. No. 14/708,342 filed on May 11, 2015; which is a continuation of U.S. patent application Ser. No. 14/006,781 filed on Dec. 20, 2013 (now U.S. Pat. No. 9,058,709); which was based upon and claimed the benefit of priority from the prior PCT/JP2012/056148 filed on Mar. 9, 2012; Japanese Patent Application No. 2011-064593 filed on Mar. 23, 2011; Japanese Patent Application No. 2011-150871 filed on Jul. 7, 2011 and Japanese Patent Application No. 2011-155976 filed on Jul. 14, 2011. The entire contents of all of these are incorporated herein by reference.

TECHNICAL FIELD

The present invention relates to a settlement system equipped with a cash settlement device that receives a manually input deposit amount from a register, calculates a change amount, and dispenses change money, a settlement method using the settlement system, and a cash settlement device.

BACKGROUND ART

In stores such as supermarkets and convenient stores, settlement systems each being equipped with a cash settlement device that performs a deposit process and a dispensing process of banknotes and coins and a POS (Point Of Sale) register that registers products purchased by customers and calculates a sales proceeds amount are arranged.

As an example of a settlement process using such a settlement system is as follows. First, the POS register calculates a sale proceeds amount and notifies the cash settlement device of the calculated sales proceeds amount. When money deposited from a customer is inserted, the cash settlement device performs a recognition process and counting. Then, the cash settlement device calculates the amount of change by subtracting the sale proceeds amount notified from the POS register from a total amount of the money deposited from the customer and dispenses the change.

In a case where there is reject money that is not accepted by the cash settlement device is included in the money received by the customer, the sale proceeds amount is changed by subtracting an amount corresponding to the reject money from the sale proceeds amount that has been calculated by operating the POS register, and the cash settlement device is notified of the sale proceeds amount after change. However, since the sale proceeds amount is changed, there is a problem that a sale proceeds amount managed by a higher-ranking machine and the amount of money stored in the cash settlement device do not coincide with each other.

In Patent Literature 1, a system equipped with a cash settlement device (change machine) and a POS register including a manual input receiving unit, to which the amount of money that has not been accepted by the cash settlement device is manually input, is disclosed. In a settlement process using such a system, the cash settlement device notifies the POS register of the amount of inserted money. The POS register calculates a total amount of money deposited from a customer by adding a manual input amount of money that has been manually input through the manual input receiving unit and the amount of inserted money that has been notified of from the cash settlement device, calculates the amount of change by subtracting a sale proceeds amount from the total amount of money that has been received, and instructs the cash settlement device to dispense change.

In this manner, in the system disclosed in Patent Literature 1, even in a case where reject money that is not accepted by the cash settlement device is included in the money deposited from a customer, a sale proceeds amount does not need to be changed in the POS register. However, in order to perform such a settlement process, it is necessary to arrange a POS register having many functions such as the reception of the amount of inserted money that is notified of from the cash settlement device, the calculation of a total amount of money deposited from the customer and the amount of change, and the instructing of outputting the change to the cash settlement device. Accordingly, there is a problem that the cost is high, and it is difficult to introduce the system into a store.

CITATION LIST

Patent Literature

Patent Literature 1: Japanese Patent No. 4194423

SUMMARY OF INVENTION

Technical Problem

An object of the present invention is to provide a settlement system capable of performing a settlement process without changing a sale proceeds amount in a register even in a case where reject money is included in money deposited from a customer, and suppressing the device cost.

Solution to Problem

According to an embodiment of the present invention, a settlement system includes a cash settlement device configured to perform a deposit process and a dispensing process of money, and a register configured to register a purchased product and calculate a sum amount of money corresponding to the purchased product. The register includes a reception unit configured to receive a manual input of information corresponding to at least a part of deposited money from a customer, and a transmission unit configured to transmit, to the cash settlement device, the sum amount of money corresponding to the purchased product and manually input information manually input through the reception unit. The cash settlement device calculates an amount of inserted money by recognizing and counting the inserted money, calculates a total amount of money deposited from a customer by using the amount of inserted money and the manually input information received from the register, calculates an amount of change based on the total amount of money and the sum amount of money received from the register, and dispenses change money.

According to an embodiment of the present invention, the cash settlement device notifies the register of the amount of the inserted money. The register includes a payment processing unit configured to perform a card payment process of an amount of money acquired by subtracting the amount of the inserted money from the sum amount of money.

According to an embodiment of the present invention, the manually input information includes denomination information of reject money that has not been accepted by the cash settlement device.

According to an embodiment of the present invention, the cash settlement device externally outputs the amount of the inserted money and the manually input information separately.

According to an embodiment of the present invention, the cash settlement device sets a first mode in which inserted money is recognized and a second mode in which inserted money is received without being recognized, the first mode and the second mode being switchable to each other.

According to an embodiment of the present invention, the cash settlement device includes a first storing unit configured to store money recognized when the first mode is set and a second storing unit configured to store money inserted when the second mode is set.

According to an embodiment of the present invention, a settlement method using a cash settlement device and a register including calculating a sum amount of money of a purchased product and transmitting the sum amount of money to the cash settlement device using the register, calculating an amount of inserted money by recognizing and counting the inserted money using the cash settlement device, receiving a manual input of information corresponding to at least a part of money deposited from a customer and transmitting the manually input information to the cash settlement device using the register, and calculating a total amount of the money deposited from the customer using the amount of the inserted money and the manually input information received from the register, calculating an amount of change based on the total amount of money and the sum amount of money received from the register, and dispensing change money using the cash settlement device.

According to an embodiment of the present invention, a cash settlement device that performs a deposit process and a dispensing process of money including a reception unit configured to receive a sum amount of money of a purchased product and manually input information from a register that calculates the sum amount of money of the purchased product and receives a manual input of the manually input information corresponding to at least a part of money deposited from a customer, a calculation unit configured to calculate an amount of inserted money by recognizing and counting the inserted money, calculate a total amount of the money deposited from the customer by using the amount of the inserted money and the manually input information received from the register, and calculate an amount of change based on the total amount of money and the sum amount of money received from the register, and a dispensing unit configured to dispense change money based on the amount of change.

A settlement system according to an embodiment of the present invention is a settlement system that includes a cash settlement device performing a deposit process and a dispensing process of money and a register registering a purchased product and calculates a sum amount of money. The cash settlement device recognizes inserted money, generates acceptance denial information for money that cannot be accepted, and outputs the acceptance denial information to the register. The register has a display unit that displays the acceptance denial information output from the cash settlement device.

In addition, the display unit of the register may be mounted to the register main body, may be disposed to be adjacent to the register main body, or may be configured as a so-called customer display that can be visually recognized by the customer. Alternatively, in a system employing so-called self-settlement, the display unit may be configured as an attendant station display that is disposed at a place located far from the cash settlement device.

As the money that cannot be accepted, particularly, a counterfeit note or a suspect note is significant. Accordingly, it is preferable that the cash settlement device recognizes inserted money, generate counterfeit note information or suspect note information for a counterfeit note or suspect note as the acceptance denial information, and output the generated information to the register.

In such a case, it is preferable that the display unit of the register also displays a handling method of a counterfeit note or a suspect note. For example, it is preferable that the display unit of the register guides the clerk to check the identification information of the customer. In a case where a counterfeit note or a suspect note is collected, it is necessary to associate the money (the counterfeit note or the suspect note) and the information of the customer who has inserted the money with each other, and accordingly, it is significant to check the information of the identification of the customer.

In addition, it is preferable that the display unit of the register guides the customer to be urged to use a different settlement method. For example, the customer is urged to perform settlement using the other money, a debit card, a credit card, or the like.

Furthermore, it is preferable that the cash settlement device rejects the money that cannot be accepted to the outside of the device in a clerk operated mode and takes the money that cannot be accepted in the device in a customer operated mode. In such a case, the counterfeit note or the suspect note can be reliably collected, and accordingly, the revision of the law that may be introduced in the near future in the Euro zone can be easily responded.

In addition, it is preferable that a printing device is connected to the cash settlement device, and, in a case where money that cannot be accepted by the cash settlement device is taken in the device, information of the taking-in be printed from the printing device as a deposit receipt.

Furthermore, it is preferable that a management device of the back office is connected to the cash settlement device, and in a case where the cash settlement device takes money that cannot be accepted by the cash settlement device in the device, the management device of the back office be notified of information relating to the taking-in from the cash settlement device.

A cash management method according to an embodiment of the present invention is a cash management method using a cash management device including an interface that is connected to systems of a plurality of transport vendors collecting money stored in a storing unit storing money or replenishing the storing unit with money in a communicable manner and a display unit displaying information. In the cash management method, in a case where it is necessary to collect the money stored in the storing unit or replenish the storing unit with money, a quotation request notification requesting for a quotation of the collection or replenishment of money is transmitted to the systems of the plurality of transport vendors, quotation reply notifications including quotation information of the collection or replenishment of money for the quotation request notification are received from the plurality of transport vendors, the quotation reply notifications acquired from the systems of the plurality of transport vendors are displayed on the display unit, and a collection/replenishment request notification for a request for the collection or replenishment of money is transmitted to one of the transport vendors selected by an operator of the cash management device.

The cash management device may detect a near-empty state representing that the money stored in the storing unit is below a first predetermined value and a near-full state representing that the money stored in the storing unit is above a second predetermined value, and the cash management device may transmit the quotation request notification to the systems of the plurality of transport vendors when the near-empty state or the near-full state is detected.

The quotation reply notification may include at least information of the cost required for collecting or replenishing the money or information of date and time at which the collection or replenishment of money is performed.

The above-described display unit may display the quotation reply notifications of the plurality of transport vendors in an ascending order of the cost required for collecting or replenishing money or in an ascending order of date and time at which the collection or replenishment of money is performed.

The above-described quotation request notification may include information of the amount of money to be collected or replenished, denomination information, or quantity information.

The above-described collection/replenishment request notification may include information of the amount of money to be collected or replenished, the denomination information, or the quantity information.

The above-described cash management device may further include a quotation request transmission button used for determining the transmission of the quotation request notification and a memory unit that stores e-mail addresses of the plurality of transport vendors to which the quotation request notification is transmitted, and, as the operator of the cash management device presses the quotation request transmission button, the cash management device may automatically transmit electronic mails to the plurality of transport vendors, which are stored in the memory unit, as the quotation request notifications.

When the operator of the cash management device selects a certain transport vendor from the plurality of transport vendors displayed on the display unit, the cash management device may automatically transmit an electronic mail to the selected transport vendor as the collection/replenishment request notification.

The above-described cash management device may be connected to an external server that can be accessed by the plurality of transport vendors in a communicable manner. In such a case, the above-described cash management device may regularly transmit a total amount of money stored in the storing unit to the external server as the quotation request notification and receive quotation reply notifications transmitted from the systems of the transport vendors based on the total amount of money stored in the storing unit that is stored in the external server.

A cash management system according to an embodiment of the present invention is a cash management system including: a cash management device that includes an interface that is connected to systems of a plurality of transport vendors collecting money stored in a storing unit storing money or replenishing the storing unit with money in a communicable manner and a display unit displaying information; the systems of the plurality of transport vendors collecting the money stored in the cash management device or replenishing the cash management device with money; and a network that connects the cash management device and the systems of the plurality of transport vendors together in a communicable manner. In the cash management system, in a case where it is necessary to collect the money stored in the storing unit or replenish the storing unit with money, the above-described cash management device transmits a quotation request notification requesting for a quotation of the collection or replenishment of money to the systems of the plurality of transport vendors, the systems of the plurality of transport vendors receive the quotation request notification and transmit quotation reply notifications including quotation information of the collection or replenishment of money for the quotation request notification to the cash management device, the cash management device receives quotation reply notifications including quotation information of the collection or replenishment of money for the quotation request notification from the systems of the plurality of transport vendors, the cash management device displays the quotation reply notifications acquired from the systems of the plurality of transport vendors on the display unit, and the cash management device transmits a collection/replenishment request notification for a request for the collection or replenishment of money to one of the transport vendors selected by an operator of the cash management device.

The cash management device may detect a near-empty state representing that the money stored in the storing unit is below a first predetermined value and a near-full state representing that the money stored in the storing unit is above a second predetermined value, and the cash management device may transmit the quotation request notification to the systems of the plurality of transport vendors when the near-empty state or the near-full state is detected.

The quotation reply notification may include at least information of the cost required for collecting or replenishing the money or information of date and time at which the collection or replenishment of money is performed.

The above-described display unit may display the quotation reply notifications of the plurality of transport vendors in an ascending order of the cost required for collecting or replenishing money or in an ascending order of date and time at which the collection or replenishment of money is performed.

The above-described quotation request notification may include information of the amount of money to be collected or replenished, denomination information, or quantity information.

The above-described collection/replenishment request notification may include information of the amount of money to be collected or replenished, the denomination information, or the quantity information.

The above-described cash management device may further include a quotation request transmission button used for determining the transmission of the quotation request notification and a memory unit that stores e-mail addresses of the plurality of transport vendors to which the quotation request notification is transmitted, and, as the operator of the cash management device presses the quotation request transmission button, the cash management device may automatically transmit electronic mails to the plurality of transport vendors, which are stored in the memory unit, as the quotation request notifications.

When the operator of the cash management device selects a certain transport vendor from the plurality of transport vendors displayed on the display unit, the cash management device may automatically transmit an electronic mail to the selected transport vendor as the collection/replenishment request notification.

The above-described cash management system may further include an external server that is connected to the cash management device in a communicable manner and can be accessed by the plurality of transport vendors. In such a case, it may be configured such that the cash management device regularly transmits a total amount of money stored in the storing unit to the external server as the quotation request notification, the external server stores the total amount of money stored in the storing unit such that the total amount of money stored in the storing unit can be accessed by the plurality of transport vendors, the systems of the transport vendors transmit the quotation reply notifications based on the total amount of money stored in the storing unit that is stored in the external server, and the cash management device receives the quotation reply notifications.

Advantageous Effects of Invention

According to the present invention, a settlement process can be performed without changing a sale proceeds amount in a register even in a case where reject money is included in money deposited from a customer, and the device cost can be suppressed.

BRIEF DESCRIPTION OF THE DRAWINGS

FIG. 2 is an external view of the cash settlement device according to the first embodiment.

FIG. 3 is a block diagram of the cash settlement device according to the first embodiment.

FIG. 6 is an external view of a register according to the first embodiment.

FIG. 7 is a block diagram of a register according to the first embodiment.

FIG. 8 is a timing diagram that illustrates a settlement method according to the first embodiment.

FIG. 9 is a timing diagram that illustrates a settlement method according to the first embodiment.

FIG. 13 is a diagram that illustrates an example of a received money certificate.

FIG. 14 is a conceptual diagram that illustrates the connection relation between a cash management system according to a third embodiment of the present invention and systems of transport vendors A to C.

FIG. 15 is a block diagram that illustrates an example of the configuration of the cash management system according to the third embodiment.

FIG. 16 is a block diagram that illustrates another example of the configuration of the cash management system according to the third embodiment.

FIG. 17 is a block diagram that illustrates an example of the configuration of a cash settlement device according to the third embodiment.

FIGS. 23A and 23B are conceptual diagrams that illustrate content of proposals for collection or replenishment that is uploaded to an ASP server.

FIG. 24 is a flowchart that illustrates the operation of the cash management system according to the fourth embodiment.

DESCRIPTION OF EMBODIMENTS

Hereinafter, embodiments of the present invention will be described with reference to the drawings. However, the embodiments are not for the purposes of limiting the present invention.

(First Embodiment)

Figure 1:
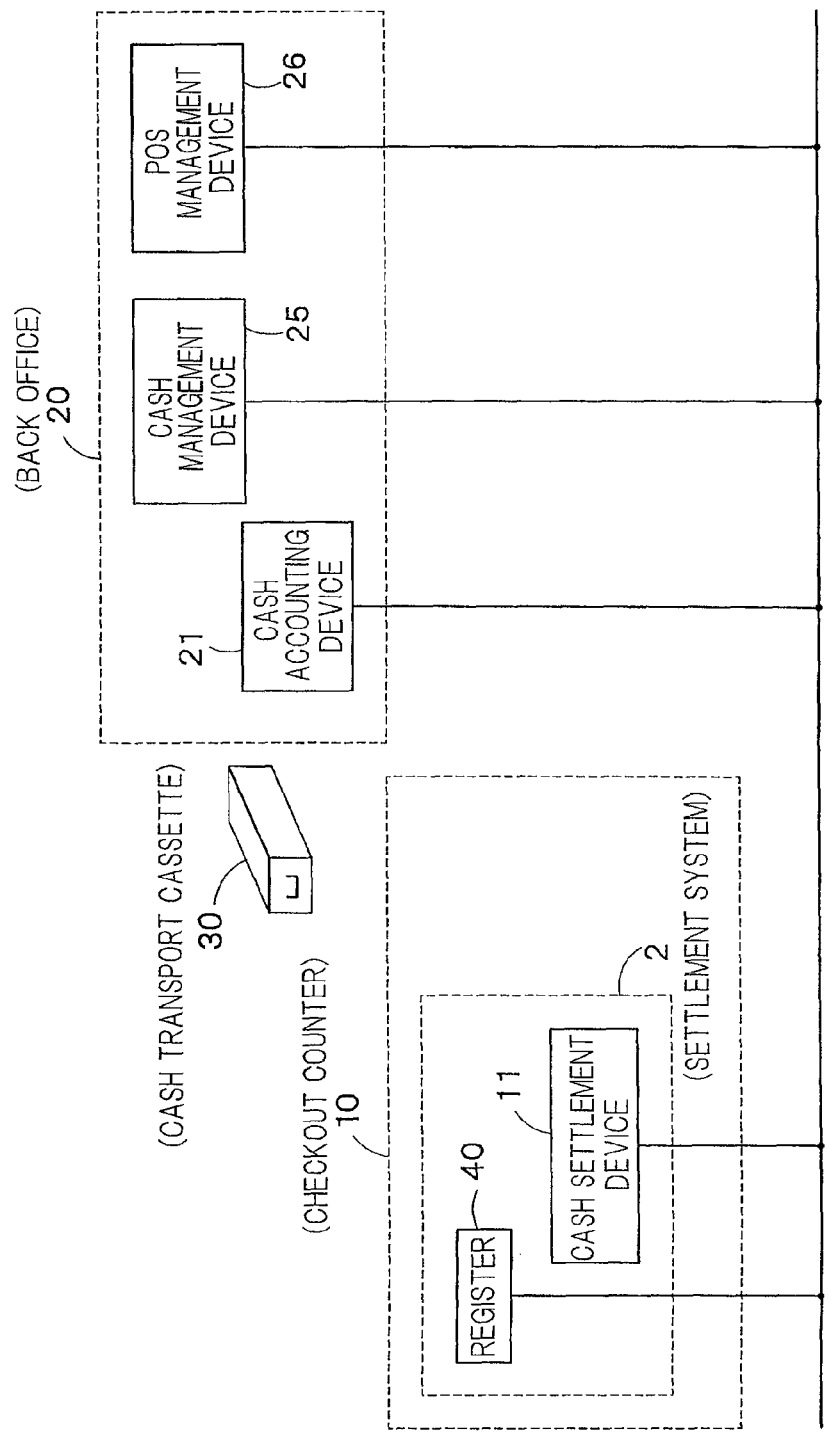
FIG. 1 is a block diagram of a cash management system according to a first embodiment of the present invention.

FIG. 1 is a block diagram that illustrates an example of the configuration of a cash management system 1 equipped with a settlement system 2 according to a first embodiment of the present invention. The cash management system 1 is a system that processes and manages cash received by a clerk from a customer and cash paid by the clerk to the customer.

The cash management system 1 is configured by: a checkout counter 10 that is disposed in a checkout area inside a store and deposits and dispenses cash exchanged between a clerk and a customer; a back office 20 that manages cash and products of the checkout counter 10; and a cash transport cassette 30 that transports cash between the checkout counter 10 and the back office 20.

In the checkout counter 10, the settlement system 2 including: a cash settlement device 11 that performs a settlement process for a customer by depositing and dispensing cash; and a register 40 that is connected to the cash settlement device 11 in a communicable manner and registers a product purchased by a customer is disposed. Here, a plurality of settlement systems 2 may be arranged.

The cash settlement device 11 is operated by a clerk or a customer and is used for a settlement process between the clerk and the customer. For example, the cash settlement device 11 deposits money paid by the customer or dispenses change to be paid to the customer. The register 40 is, for example, a POS register operated by the clerk.

In the back office 20, a cash accounting device 21, a cash management device 25, and a POS management device 26 are disposed. The cash accounting device 21 is connected to the cash settlement device 11 in a communicable manner and, for example, dispenses change fund used for being loaded into the cash settlement device 11 or deposits sales proceeds collected from the cash settlement device 11.

The cash management device 25 is connected to the cash settlement device 11 and the cash accounting device 21 through a LAN (Local Area Network) or the like in a communicable manner. The cash management device 25 manages cash stored in the cash settlement device 11 and the cash accounting device 21. For example, the cash management device 25 manages settled cash in each cash settlement device 11 and cash transferred and received between the cash settlement device 11 and the cash accounting device 21. In addition, the cash management device 25 may monitor whether the cash transport cassette 30 is installed to the cash settlement device 11 or the cash accounting device 21.

The POS management device 26 is connected to the register 40 disposed in the checkout counter 10 through a LAN or the like in a communicable manner and manages the flow of products and the sales of a store.

The cash transport cassette 30 is configured to be detachably attached to the cash settlement device 11 and the cash accounting device 21, and can transfer or receive cash to/from the cash settlement device 11 or the cash accounting device 21 when being installed to the cash settlement device 11 or the cash accounting device 21. On the other hand, when being detached from the cash settlement device 11 and cash accounting device 21, the cash transport cassette 30 stores cash disposed therein so as not to be taken out. A clerk transports cash between the cash settlement device 11 and the cash accounting device 21 using the cash transport cassette 30. For example, when change fund is loaded or sales proceeds are collected, the clerk transports cash between the cash settlement device 11 and the cash accounting device 21 using the cash transport cassette 30. Since the clerk cannot be in touch with the cash disposed inside the cash transport cassette 30 at the time of transporting the cash, the cash can be transported in a secured state in terms of security.

The cash transport cassette 30 may be configured to transport any one of a banknote and a coin or may be configured to transport both thereof. The cash transport cassette 30 used for banknotes may be a stack-type cassette in which banknotes are stored in an overlapping manner or a tape reel-type cassette in which, in a state in which each banknote is interposed between a plurality of tapes, the tapes are wound together with the banknote. On the other hand, the cash transport cassette 30 used for coins may be a cassette storing coins in a state in which denominations are mixed.

The configuration of the cash settlement device 11 will be described with reference to FIGS. 2 to 5. Each cash settlement device 11 includes a coin settlement device 13 that performs a settlement process by depositing and dispensing coins and a banknote settlement device 12 that performs a settlement process by depositing and dispensing banknotes.

Hereinafter, in order to discriminate the constituent elements of the banknote settlement device 12 and those of the coin settlement device 13 from each other, "a" is attached to a reference sign of each constituent element of the banknote settlement device 12, and "b" is attached to a reference sign of each constituent element of the coin settlement device 13. In addition, handling targets of the coin settlement device 13 and the banknote settlement device 12 are different from each other as coins and banknotes, and accordingly, the specific configurations thereof are different each other. However, the coin settlement device 13 and the banknote settlement device 12 may have the same basic block configuration as that illustrated in FIG. 3.

FIG. 2 is an external view that illustrates an example of each cash settlement device 11. The cash settlement device 11 includes the banknote settlement device 12 and the coin settlement device 13. The banknote settlement device 12 includes a housing 100*a*, a deposit unit 110*a*, and a dispensing unit 120*a*. The deposit unit 110*a* is arranged so as to input banknotes received from customers. The dispensing unit 120*a* is arranged so as to dispense a change banknote. When a front cover 101*a* of the housing 100*a* is open, a cassette installation unit (see 160*a* illustrated in FIG. 4) used for installing the cash transport cassette 30 is disposed.

The coin settlement device 13 includes a housing 100*b*, a deposit unit 110*b*, and a dispensing unit 120*b*. The deposit unit 110*b* is arranged so as to insert coins received from customers. The dispensing unit 120*b* is arranged so as to dispense change coins. When a front cover 101*b* of the housing 100*b* is open, a cassette installation unit (see 160*b* illustrated in FIG. 5) used for installing the cash transport cassette 30 is disposed.

FIG. 3 is a block diagram that illustrates an example of the configuration of the cash settlement device 11. In addition to the deposit unit 110 and the dispensing unit 120, the cash settlement device 11 is further equipped with: a transport unit 130; a recognition unit 140; a storing unit 150; a cassette installation unit 160; a memory 170; a communication unit 180; and a control unit 190.

The transport unit 130 transports cash input to the deposit unit 110 to the storing unit 150 or transports cash to be dispensed from the dispensing unit 120 from the storing unit 150. In addition, the transport unit 130 is configured to transport cash disposed inside the cash transport cassette 30 installed to the cassette installation unit 160 so as to load cash into the storing unit 150 to the storing unit 150 or to transport cash stored in the storing unit 150 so as to collect cash from the storing unit 150 to the cash transport cassette 30.

The recognition unit 140 is configured to detect the denomination, the authenticity, the fitness, the old/new type, the quantity, and the like of the cash transported by the transport unit 130. For example, the recognition unit 140 is equipped with a sensor such as an imaging sensor or a magnetic sensor.

The storing unit 150 is configured to store cash recognized by the recognition unit 140 for each denomination. In a case where banknotes are stored, the storing unit 150 may be a stack-type storing unit that stores banknotes to be overlapped for each denomination or may be configured as a plurality of tape reel-type storing units having each banknote to be in a state being interposed between a plurality of tapes for each denomination and winding the tapes together with the banknote.

The cassette installation unit 160 is configured such that the cash transport cassette 30 can be detachably attached thereto. The cassette installation unit 160 is configured to deposit cash from the cash transport cassette 30 or dispense cash to the cash transport cassette 30.

The memory 170 includes a ROM (Read Only Memory) or a HDD (Hard Disk Drive) that stores various programs and data used for controlling the cash settlement device 11, a RAM (Random Access Memory) that serves as a program loading area or a work area at the time of executing a program, and the like. The memory 170 also stores information (the denomination, the quantity, and the like) of cash stored in the storing unit 150 and the cash transport cassette 30. Here, the memory 170 may store the quantity of cash recognized by the recognition unit 140 for each denomination.

The communication unit 180 is connected to the other devices (the cash accounting device 21, the cash management device 25, and the POS management device 26) configuring the cash processing system 1 and the register 40 in a communicable manner.

The control unit 190 is an arithmetic processing unit configured to control the whole cash settlement device 11 by executing a program stored in the memory 170.

The control unit 190 calculates the amount (the amount of inserted money) of cash inserted into the deposit unit 110 based on results of recognizing and counting performed by the recognition unit 140. In addition, the control unit 190 receives information (hereinafter, referred to as manually input information) corresponding to at least a part of money deposited from a customer, which is manually input to the register 40, from the register 40 through the communication unit 180 and calculates a total amount of money deposited from the customer based on the manually input information and the amount of inserted money.

In addition, the control unit 190 receives a total amount of money corresponding to products purchased by the customer from the register 40 through the communication unit 180 and calculates the amount of change by subtracting the total amount of money corresponding to the purchased products from the total amount of money deposited from the customer. Then, the control unit 190 performs control of each unit of the cash settlement device 11 such that change corresponding to the calculated amount of change is dispensed.

Furthermore, the control unit 190 can separately output the calculated amount of the inserted money and the manually input information received from the register 40 to the cash management device 25. Accordingly, the cash management device 25 can separately manage the amount of cash actually stored in the cash settlement device 11 and the amount of money (for example, reject money) that is not stored in the cash settlement device 11 but is processed to be deposited.

Figure 4:
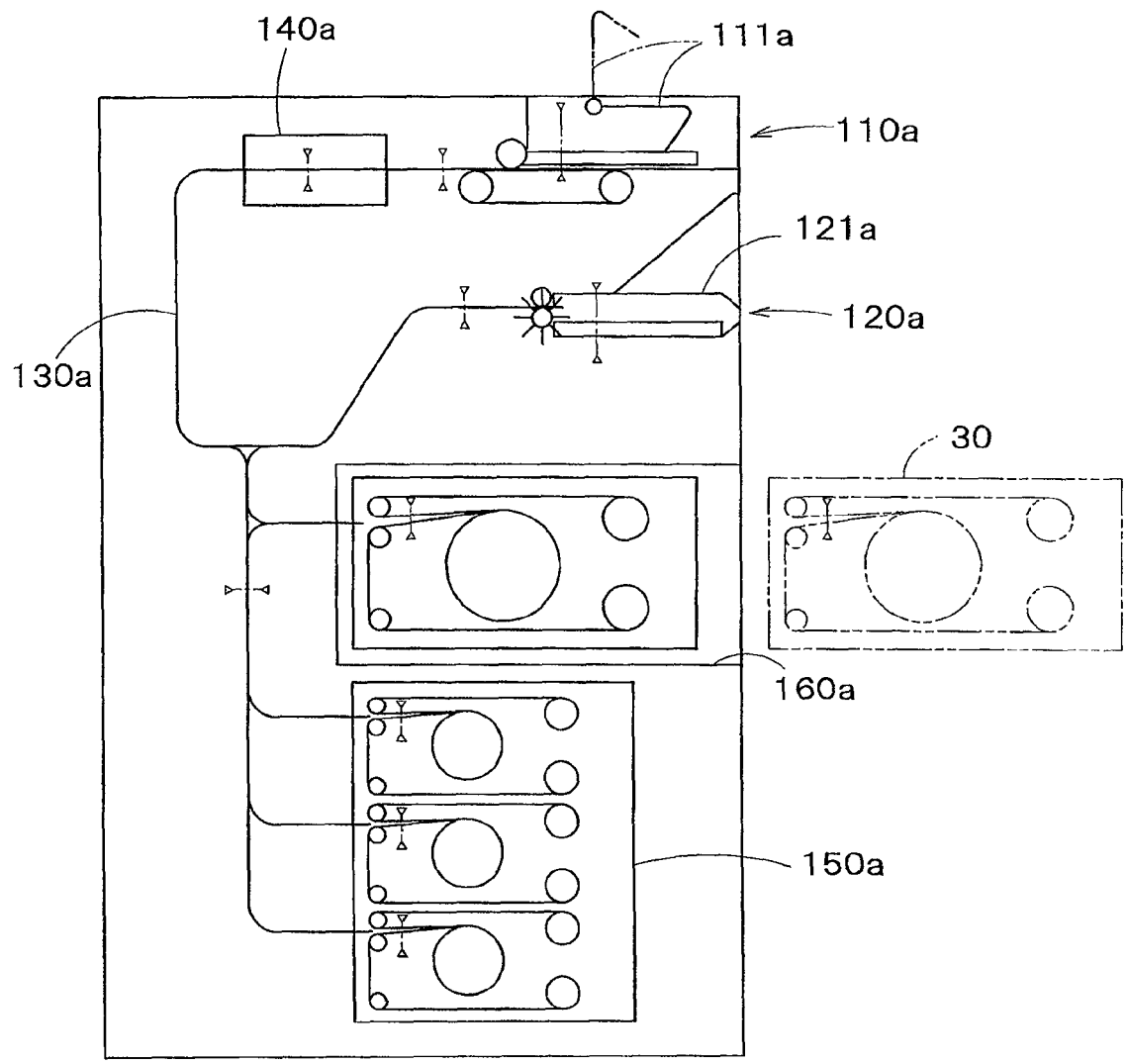
FIG. 4 is a cross-sectional view of a banknote settlement device according to the first embodiment.
Figure 5:
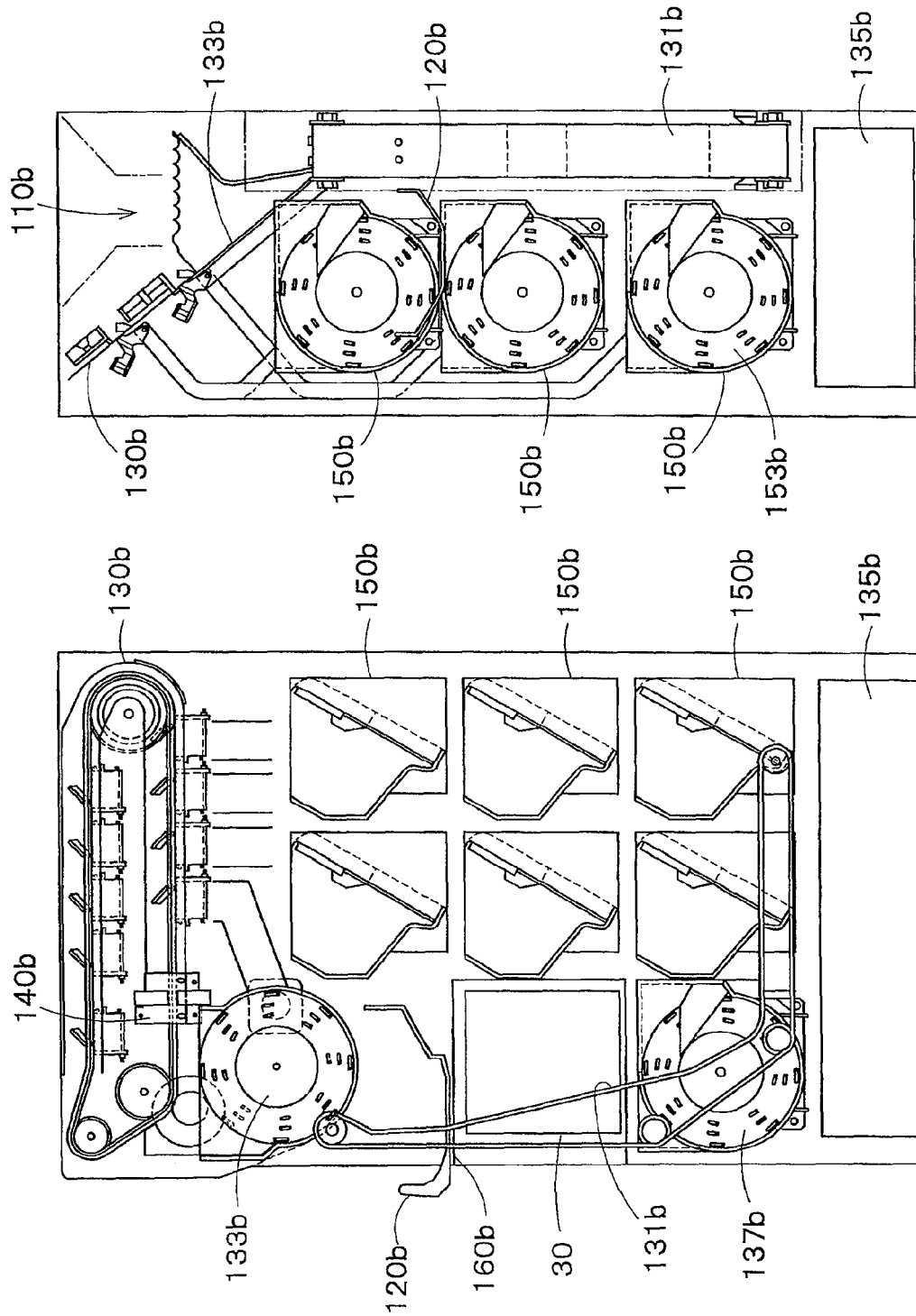
FIGS. 5A and 5B are cross-sectional views of a coin settlement device according to the first embodiment.

FIG. 4 is a cross-sectional view that illustrates an example of the internal configuration of the banknote settlement device 12 of the cash settlement device 11. The banknote settlement device 12 is equipped with a deposit unit cover 111a, and a clerk (or a customer) opens the deposit unit cover 111a at the time of depositing money and inserts banknotes into the deposit unit 110a. The deposit unit 110a is configured to feed the inserted banknotes one banknote at a time to a transport unit 130a. The transport unit 130a is configured to pass the fed banknotes through a recognition unit 140a and then transport the banknotes to a storing unit 150a, the cash transport cassette 30, or the dispensing unit 120a. The recognition unit 140a recognizes the denomination, the authenticity, the fitness, the old/new type, the quantity, and the like of the banknote that is transported. The transport unit 130a stores the banknotes in the storing unit 150a based on a result of the recognition process performed by the recognition unit 140a for each denomination.

In addition, the transport unit 130a may transport a banknote to the cash transport cassette 30 as is necessary as in a case where the storing unit 150a is full or the like. In a case where a banknote cannot be recognized by the recognition unit 140a, a counterfeit note is recognized, or the like, the transport unit 130a dispenses the banknote to the dispensing unit 120a.

Meanwhile, in order to dispense banknotes, the storing unit 150a is configured to feed the banknotes to the transport unit 130a one banknote at a time. The transport unit 130a transports the fed banknotes to the dispensing unit 120a. The banknote settlement device 12 is equipped with a dispensing unit shutter 121a and opens the dispensing unit shutter 121a at the time of dispensing money and dispenses a banknote.

In this manner, the banknote settlement device 12 can store a banknote inserted into the deposit unit 110a in the storing unit 150a and, oppositely, can dispense a banknote stored in the storing unit 150a to the dispensing unit 120a. In other words, the banknote settlement device 12 is configured to reuse an inserted banknote for dispense.

In a case where the cash transport cassette 30 is installed to the cassette installation unit 160a, the banknote settlement device 12 can load banknotes from the cash transport cassette 30 into the storing unit 150a or collect banknotes from the storing unit 150a into the cash transport cassette 30a. In a case where banknotes are to be loaded, the cash transport cassette 30 feeds banknotes to the transport unit 130a one banknote at a time. The transport unit 130a loads the fed banknotes in the storing unit 150a. In a case where banknotes are collected, the storing unit 150a feeds banknotes to the transport unit 130a one banknote at a time. The transport unit 130a collects the banknotes that have been fed into the cash transport cassette 30.

In this manner, the banknote settlement device 12 is configured to load and collect banknotes using the cash transport cassette 30.

FIGS. 5A and 5B are cross-sectional views that illustrate an example of the internal configuration of the coin settlement device 13 of the cash settlement device 11. FIG. 5A is a cross-sectional view acquired when the coin settlement device 13 is seen from the lateral side, and FIG. 5B is a cross-sectional view acquired when the coin settlement device 13 is seen from the front side. In FIG. 5B, the cash transport cassette 30 and a feeding unit 137b are not illustrated, but a storing unit 150b is illustrated.

The coin settlement device 13, as illustrated in FIG. 5B, is equipped with the deposit unit 110b, and a clerk (or a customer) inserts coins into the deposit unit 110b at the time of deposit. At this time, coins of a plurality of denominations may be inserted in a mixed state. A feeding unit 133b of a disc type is configured to feed coins inserted into the deposit unit 110b to a transport unit 130b one coin at a time. The transport unit 130b passes the fed coins through a recognition unit 140b and then, transports the coins to the storing unit 150b, the cash transport cassette 30, or the dispensing unit 120b. The recognition unit 140b recognizes the denomination, the authenticity, the fitness, the old/new type, the quantity, and the like of the transported coin. The transport unit 130b sorts the coins by denomination based on a result of the recognition process performed by the recognition unit 140b and stores the coins in the storing units 150b for the corresponding denomination.

Here, the transport unit 130b may transport the coins to the cash transport cassette 30 or a collect box 135b as is necessary as in a case where the storing unit 150b is full. In addition, in a case where a coin is recognized as a reject coin by the recognition unit 140b, the transport unit 130b dispenses the reject coin to the dispensing unit 120b.

Meanwhile, in order to dispense coins, the storing unit 150b is configured to feed the coins to a transport unit 131b one coin at a time. A plurality of storing units 150b store money for each denomination, and each thereof is equipped with a feeding unit 153b of the disc type. The feeding unit 153b is configured to feed coins to the transport unit 130b one coin at a time. The transport unit 130b transports the fed coins to the dispensing unit 120b. From this, the coin settlement device 13 dispenses the coins to the dispensing unit 120b.

In this manner, the coin settlement device 13 can store the coins inserted into the deposit unit 110b in the storing unit 150b and, oppositely, can dispense the coins stored in the storing unit 150b to the dispensing unit 120b. In other words, the coin settlement device 13 is configured to reuse inserted coins for dispense.

In a case where the cash transport cassette 30 is installed to the cassette installation unit 160b, the coin settlement device 13 can load coins from the cash transport cassette 30 into the storing unit 150b or collect coins from the storing unit 150b into the cash transport cassette 30b. In a case where coins are to be loaded, the cash transport cassette 30 dispenses the coins to the feeding unit 137b illustrated in FIG. 5A. At this time, the cash transport cassette 30 may dispense coins to the feeding unit 137b in a state in which denominations are mixed. The feeding unit 137b feeds the coins to the transport unit 131b. The transport unit 131b transports the fed coins to the feeding unit 133b, and the feeding unit 133b feeds coins to the transport unit 130b one coin at a time. The transport unit 130b is configured to pass the fed coins through the recognition unit 140b and then transport the coins to the storing unit 150b or the dispensing unit 120b. The recognition unit 140b recognizes the denominations of the coins that are transported. The transport unit 130b stores the coins in the storing unit 150b for each denomination based on a result of the recognition process performed by the recognition unit 140b.

In a case where coins are to be collected, the coin settlement device 13 feeds coins from the storing unit 150b to the transport unit 131b one coin at a time. The transport unit 131b collects the fed coins into the cash transport cassette 30.

In this manner, the coin settlement device 13 is configured to load and collect coins by using the cash transport cassette 30.

Next, the configuration of the register 40 will be described with reference to FIGS. 6 and 7. FIG. 6 illustrates the external view of the register 40, and FIG. 7 illustrates the block configuration of the register 40. As illustrated in FIGS. 6 and 7, the register 40 is equipped with: a display unit 402 that displays various kinds of information; a keyboard 404 that receives a manual input for various kinds of information and various instructions from a clerk; a printer 406 that outputs a receipt on which the content of a transaction is printed; a reading unit 408 that reads out product information; a communication unit 410 that communicates with the cash settlement device 11 and the POS management device 26; a control unit 412; and a memory 414.

The keyboard 404 can receive a manual input of information corresponding to at least a part of money deposited from a customer. Here, the manually input information is, for example, the number of units of reject money for each denomination, which has not been deposited to the cash settlement device 11.

The reading unit 408 is, for example, a barcode scanner that reads out a barcode attached to a product purchased by a customer. By reading a barcode using the reading unit 408, the register 40 can acquire product information of a product purchased by a customer and register the product information.

As illustrated in FIG. 6, the register 40 may be equipped with a display unit (customer display) 402a facing a customer. The display unit 402 may be configured by a touch panel. In such a case, the display unit 402 can receive a manual input of information of reject money that cannot be deposited to the cash settlement device 11.

The memory 414 includes a ROM (Read Only Memory) or a HDD (Hard Disk Drive) that stores various programs and data used for controlling the cash settlement device 11, a RAM (Random Access Memory) that serves as a program loading area or a work area at the time of executing a program, and the like. In addition, the memory 414 stores a table in which each combination of product information and the amount of money corresponding thereto is included.

The control unit 412 is an arithmetic processing unit configured to control the whole register 40 by executing a program stored in the memory 414. The control unit 412 can calculate a total amount of money corresponding to products purchased by a customer by acquiring the amounts of money corresponding to the products by searching a table stored in the memory 414 using the product information read by the reading unit 408.

In addition, the control unit 412 may transmit the total amount of money corresponding to the purchased products and the manually input information received from the keyboard 404 to the cash settlement device 11 through the communication unit 410. Furthermore, the control unit 412 may transmit the product information of products purchased by a customer to the POS management device 26 through the communication unit 410.

Next, a settlement method using the settlement system 2 that includes the cash settlement device 11 and the register 40 will be described.

First, a case will be described with reference to a timing diagram illustrated in FIG. 8 in which reject money is not included in the money paid by a customer.

(Step S101)

The product information of a product purchased by a customer is registered in the register 40, and the purchased amount of money is calculated.

(Step S102)

The register 40 transmits the purchased amount of money to the cash settlement device 11.

(Step S103)

Money paid by the customer is inserted into the cash settlement device 11. The insertion of money may be performed by a clerk or the customer. The cash settlement device 11 performs a depositing process including recognizing and counting of the inserted money.

(Step S104)

The cash settlement device 11 calculates the amount of the inserted money.

(Step S105)

The cash settlement device 11 sets the amount of inserted money calculated in Step S104 as a total amount of money deposited by the customer and calculates the amount of change based on the total amount of the deposited money and the purchased amount of money received from the register 40 in Step S102.

(Step S106)

The cash settlement device 11 dispenses change money based on the amount of change calculated in Step S105. More specifically, the banknote settlement device 12 dispenses change banknotes from the dispensing unit 120a, and the coin settlement device 13 dispenses change coins from the dispensing unit 120b.

The change money may be handed from the clerk to the customer, or the dispensed change money may be directly received by the customer.

(Step S107)

The cash settlement device 11 notifies the register 40 of the completion of dispense of the change money.

(Step S108)

The printer 406 of the register 40 outputs a receipt on which contents of the transaction including the product information of the product purchased by the customer, the purchased amount of money, the amount of money paid by the customer, the amount of change, and the like are printed. The clerk hands the output receipt to the customer.

Next, a case will be described with reference to a timing diagram illustrated in FIG. 9 in which reject money is included in the money paid by a customer.

(Step S201)

The product information of a product purchased by a customer is registered in the register 40, and the purchased amount of money is calculated.

(Step S202)

The register 40 transmits the purchased amount of money to the cash settlement device 11.

(Step S203)

Money paid by the customer is inserted into the cash settlement device 11. The insertion of money may be performed by a clerk or the customer himself. The cash settlement device 11 performs a depositing process including the recognizing and counting of the inserted money.

(Step S204)

The cash settlement device 11 returns reject money. More specifically, the banknote settlement device 12 dispenses reject banknotes from the dispensing unit 120a, and the coin settlement device 13 dispenses reject coins from the dispensing unit 120b.

(Step S205)

The cash settlement device 11 calculates the amount of inserted money except for the reject money.

(Step S206)

The clerk visually checks the reject money and manually inputs information (for example, the number of units and the amount of money for each denomination) of the reject money using the keyboard 404. The reject money is stored in a drawer or the like that is not illustrated in the figure.

(Step S207)

The register 40 transmits information (manually input information) that is manually input in Step S206 to the cash settlement device 11.

(Step S208)

The cash settlement device 11 calculates a total amount of money deposited from the customer by using the amount of inserted money calculated in Step S205 and the manually input information received from the register 40 in Step S207.

(Step S209)

The cash settlement device 11 calculates the amount of change based on the total amount of the deposited money calculated in Step S208 and the purchased amount of money received from the register 40 in Step S202.

(Step S210)

The cash settlement device 11 dispenses change money based on the amount of the change calculated in Step S209. More specifically, the banknote settlement device 12 dispenses change banknotes from the dispensing unit 120a, and the coin settlement device 13 dispenses change coins from the dispensing unit 120b.

The change money may be handed from the clerk to the customer, or the dispensed change money may be directly received by the customer.

(Step S211)

The cash settlement device 11 notifies the register 40 of the completion of dispense of the change money.

(Step S212)

The printer 406 of the register 40 outputs a receipt on which contents of the transaction including the product information of the product purchased by the customer, the purchased amount of money, the amount of money paid by the customer, the amount of the change, and the like are printed. The clerk hands the output receipt to the customer.

In this manner, according to the settlement system 2 of this embodiment, even in a case where reject money is included in the money paid by the customer, the sale proceeds amount does not need to be changed in the register 40, and accordingly, the sale proceeds amount managed by the higher-ranking machine (POS management device 26) and the amount of cash stored in the store can coincide with each other.

In addition, in the settlement system 2, the cash settlement device 11 calculates the amount of the change. The register 40 may have a function for calculating a total amount of money corresponding to purchased products and a function for transmitting the total amount of money and the information of reject money that is manually input from the clerk to the cash settlement device 11 and does not need to have a function for receiving the amount of inserted money from the cash settlement device 11, a function for calculating the amount of the change, the function for outputting a change dispensing instruction to the cash settlement device 11, and the like. Accordingly, the register 40 can be configured at a low cost, whereby the settlement system 2 can be easily introduced into a store.

Figure 10:
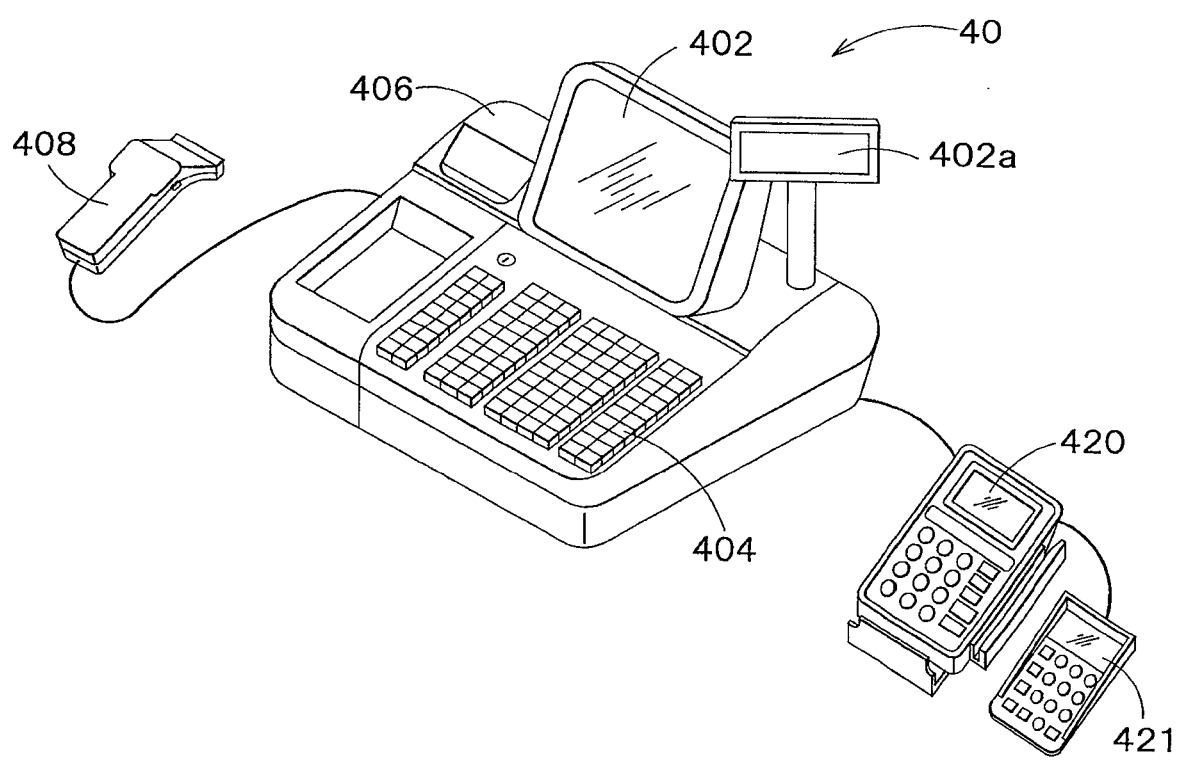
FIG. 10 is an external view of a register according to a modified example.

The register 40 may be equipped with a payment processing unit that performs card payment processing using a credit card or the like. For example, the card payment processing unit includes: a card reading unit 420 that reads card information as illustrated in FIG. 10; an input unit 421 that receives an input of a password or the like; and a determination unit (not illustrated in the figure) that communicates with a card company or the like and determines whether a card can be used. By arranging such a card payment processing unit, the register 40 can perform card payment of a customer's purchased amount.

In the register 40, a function for receiving information of the amount of inserted money from the cash settlement device 11 may be further arranged, so that the amount of a difference can be paid by a credit card in a case where the amount of inserted money is less than the purchased amount of money.

In the above embodiment, the reject money is described to be stored in the drawer or the like, the reject money may be stored in the cash settlement device 11. In such a case, it is preferable that the cash settlement device 11 is configured to be switchable to be in an automatic deposit mode in which inserted money is recognized and is stored in the storing unit 150 or a manual deposit mode in which inserted money is received without being recognized and is stored in the storing unit 150.

In addition, since the plurality of storing units 150 are disposed in the cash settlement device 11, the storing unit 150 that stores money recognized by the recognition unit 140 in a case where the automatic deposit mode is set and the storing unit 150 that stores money deposited in a case where the manual deposit mode is set may be configured to be different from each other. In this manner, by changing the storing unit 150 to use in accordance with the deposit mode, normal money and reject money can be stored separately. In addition, only normal money can be set as money to be dispensed so as to be reused.

Furthermore, the cash settlement device 11 may count the number of units of inserted money when the manual deposit mode is set and compare the counted value with the number of units of reject money that is based on the manually input information received from the register 40.

(Second Embodiment)

In the first embodiment described above, although the reject money returned by the cash settlement device 11 is visually checked by the clerk, at that time, by displaying the reason for the rejection to the clerk, the subsequent settlement process can be performed in a speedy manner. In this embodiment, a cash settlement device 11 generates acceptance denial information for money that cannot be accepted, and the register 40 displays the acceptance denial information. The configurations of a cash management system 1, a settlement system 2, a cash settlement device 11, a banknote settlement device 12, a coin settlement device 13, and a register 40 according to this embodiment are the same as those according to the first embodiment illustrated in FIGS. 1 to 7. Hereinafter, points that are different from those of the first embodiment will be mainly described.

A control unit 190 of the cash settlement device 11 is configured to generate stained note information in a case where the result of recognizing each money (cash) inserted into a deposit unit 110 is unidentifiable due to a stain, generate counterfeit note information in a case where the money is apparently a counterfeit note, and generate suspect note information in a case where the money is suspected to be a counterfeit note. Then, each generated information is output to a display unit 402 of the register 40.

The control unit 190 is configured to calculate the amount (the amount of inserted money) of cash inserted into to the deposit unit 110 based on results of recognizing and counting performed by a recognition unit 140. In addition, the control unit 190 receives a total amount of money corresponding to products purchased by the customer from the register 40 through a communication unit 180 and calculates the amount of change by subtracting the total amount of money corresponding to the purchased products from the total amount of money deposited by the customer. Then, the control unit 190 performs control of each unit of the cash settlement device 11 such that change corresponding to the calculated amount of change is dispensed.

Meanwhile, in a case where any one of the stained note information, the counterfeit note information, and the suspect note information is generated, the settlement process is stopped. In such a case, the amount of inserted cash is output to a cash management device 25 with being in a state in which a breakdown of a fit note, a stained noted, a counterfeit note, and a suspect note is discriminated. Accordingly, the cash management device 25 can respectively manage fit notes, stained notes, counterfeit notes, and suspect notes separately. The settlement process, as will be described later, is resumed depending on a clerk's input operation for the register 40.

In addition, a transport unit 130a may transport a banknote to a cash transport cassette 30 as is necessary as in a case where a storing unit 150a is full or the like. As described above, in a case where a banknote cannot be recognized due to a stain (stained note) or a counterfeit note (a counterfeit note or a suspect not) is recognized in a recognition unit 140a, the control unit 190 is configured to output such acceptance denial information to the display unit 402 of the register 40.

On the display unit 402, contents of a transaction including the product information of a product purchased by the customer, the purchased amount of money, the amount of payment of the customer, the amount of the change, and the like are displayed, and, as described above, the acceptance denial information generated in the result of the recognition process for each money (cash) inserted into the deposit unit 110, in other words, the stained note information, the counterfeit note information, and/or the suspect note information are displayed. In addition, in a case where the counterfeit note information or the suspect note information is displayed, the display unit 402 according to this embodiment displays the subsequent handling method of the counterfeit note or the suspect note together. Furthermore, in a case where the counterfeit note information or the suspect note information is displayed, the display unit 402 according to this embodiment is configured to offer guidance to check the personal identification information of the customer.

A keyboard 404 can receive an instruction from the clerk for resuming the settlement process that has been stopped when the acceptance denial information is generated. Here, the input instruction, for example, may be the return (rejection) of all the money (cash) inserted into the deposit unit 110. Alternatively, the instruction may be additional insertion corresponding to the amount of money for the counterfeit note or the suspect note inserted into the deposit unit 110. Alternatively, the instruction may be the return (rejection) of money (cash) except for the counterfeit note or the suspect note inserted into the deposit unit 110.

In a case where the cash management device 25 takes money that cannot be accepted by the cash settlement device 11 therein, the cash management device 25 manages information relating to the taking-in.

Figure 11:
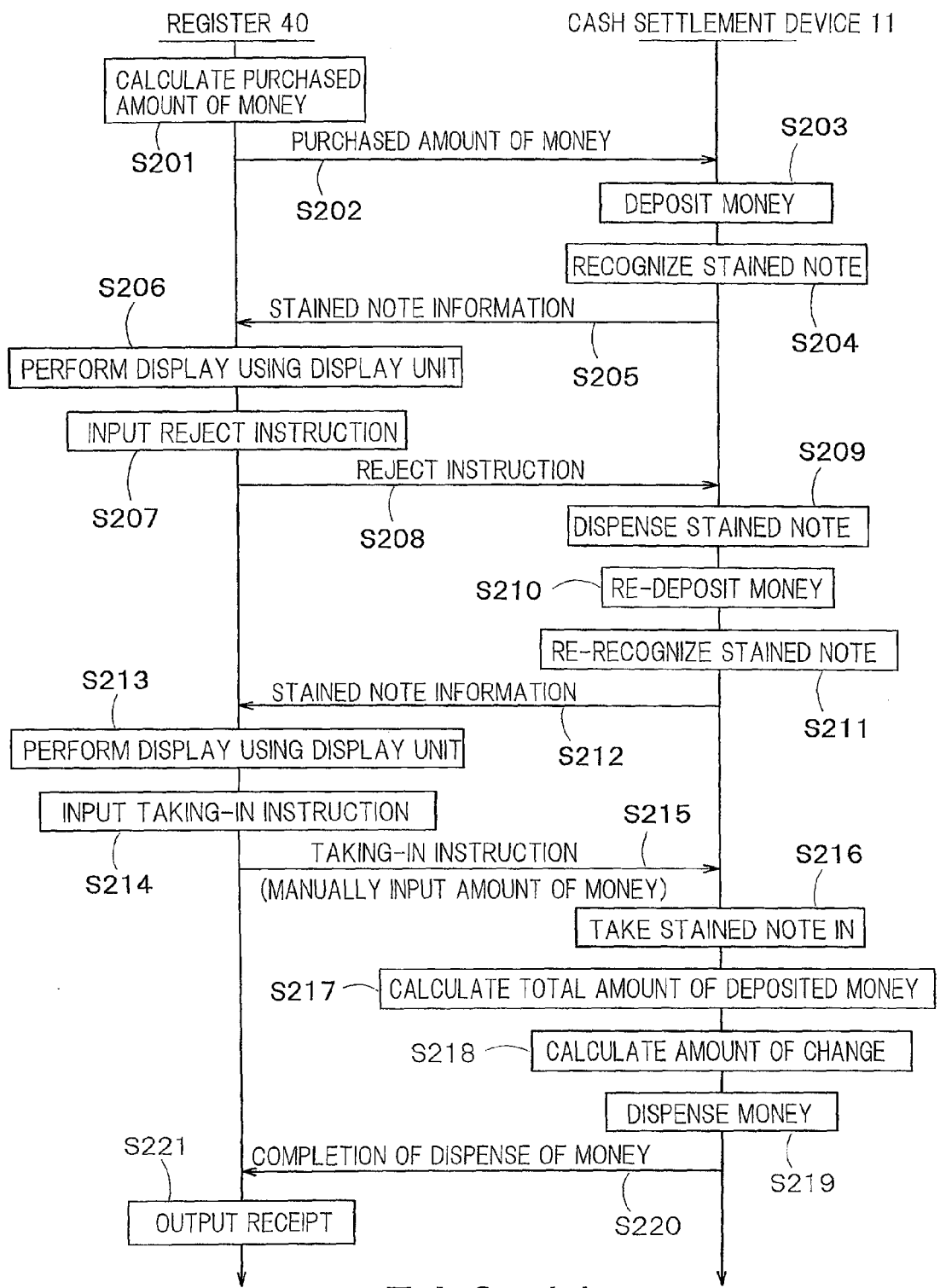
FIG. 11 is a timing diagram that illustrates a settlement method according to a second embodiment.

A case will be described with reference to a timing diagram illustrated in FIG. 11 in which a stained note is included as money that cannot be accepted out of money paid by the customer.

(Step S301)
The product information of a product purchased by a customer is registered in the register 40, and the purchased amount of money is calculated.

(Step S302)
The register 40 transmits the purchased amount of money to the cash settlement device 11.

(Step S303)
Money paid by the customer is inserted into the cash settlement device 11. The insertion of money may be performed by a clerk or the customer himself. The cash settlement device 11 performs a depositing process including the recognizing and counting of the inserted money.

(Step S304)
When the cash settlement device 11 recognizes a stained note (for example, recognizes that the denomination is unidentifiable), the stained note information is generated.

(Step S305)
The cash settlement device 11 transmits the stained note information to the register 40.

(Step S306)
The stained note information output to the register 40 is displayed on the display unit 402 of the register 40. In addition, on the display unit 402 of the register 40, a screen for selecting a stained note rejecting operation or a stained note taking-in operation is displayed.

(Step S307)
Then, the clerk inputs an instruction using the keyboard 404 of the register 40. In this example, a reject instruction for the stained note is input.

(Step S308)
The register 40 transmits the reject instruction to the cash settlement device 11.

(Step S309)
The cash settlement device 11 performs a stained note rejecting process based on the reject instruction transmitted from the register 40. In other words, the banknote settlement device 12 or the coin settlement device 13 dispenses the stained note from a dispensing unit 120a or the dispensing unit 120b.

(Step S310)

For money of the inserted stained note that is determined to be acceptable without any problem through clerk's visual checking a water mark or the like, the money is inserted into the cash settlement device 11 again (money that has a problem and cannot be determined to be acceptable is replaced with customer's other money that is determined to be acceptable by the clerk, and the money after the replacement is inserted (alternatively, the customer is urged to perform such insertion)).

(Step S311)

In such a case, the cash settlement device 11 recognizes a stained note again, and the stained note information is generated again.

(Step S312)

The cash settlement device 11 transmits the stained note information to the register 40 again.

(Step S313)

The stained note information output to the register 40 is displayed on the display unit 402 of the register 40 again. Also at this time, on the display unit 402 of the register 40, the screen for selecting a stained note rejecting operation or a stained note taking-in operation is displayed.

(Step S314)

At this time, the clerk inputs an instruction for the stained note taking-in operation using the keyboard 404 of the register 40. From this, the operation of "being unidentifiable→rejecting" is prevented from being repeated, whereby the extension of the registration standby time of other customers who are aligned thereafter can be suppressed.

(Step S315)

The register 40 transmits the instruction for taking in the stained note to the cash settlement device 11.

(Step S316)

The cash settlement device 11 performs the stained note taking-in process based on the instruction for taking in the stained note that is transmitted from the register 40.

(Step S317)

Then, the cash settlement device 11 calculates a total amount of money deposited from the customer by using the amount of money corresponding to inserted fit notes calculated in Step S303 and the amount of money (for example, manually input from the keyboard 404 of the register 40) corresponding to inserted stained notes taken in Step S306.

(Step S318)

The cash settlement device 11 calculates the amount of change based on the total amount of the deposited money calculated in Step S317 and the purchased amount of money received from the register 40 in Step S302.

(Step S319)

The cash settlement device 11 dispenses change money based on the amount of change calculated in Step S318. More specifically, the banknote settlement device 12 dispenses change banknotes from the dispensing unit 120*a*, and the coin settlement device 13 dispenses change coins from the dispensing unit 120*b*. The change money may be handed from the clerk to the customer, or the dispensed change money may be directly received by the customer.

(Step S320)

The cash settlement device 11 notifies the register 40 of the completion of dispense of the change money.

(Step S321)

A printer 406 of the register 40 outputs a receipt on which contents of the transaction including the product information of the product purchased by the customer, the purchased amount of money, the amount of money paid by the customer, the amount of the change, and the like are printed. The clerk hands the output receipt to the customer.

In the form described above with reference to FIG. 11, although stained notes are stored in the cash settlement device 11 (more specifically, a storing unit 150), the stained notes may be stored in a drawer or the like that is arranged separately from the cash settlement device 11. In the case where the stained notes are stored in the storing unit 150, it is preferable that the storing unit 150 for storing the stained notes is specified in advance. In such a case, the stained notes can be stored separately from fit notes (normal money), and accordingly, only the fit notes can be set as money to be dispensed and be reused.

In addition, after a stained note is recognized in Step S304, the stained note may be automatically dispensed (rejected) simultaneously with the display operation performed by the display unit (S306). In such a case, Steps S307 and S308 are omitted. Furthermore, after Step S309, a total amount of the deposited money may be calculated based on the manually input amount without re-depositing the stained note. In such a case, Steps S310 to S316 are omitted.

Figure 12:
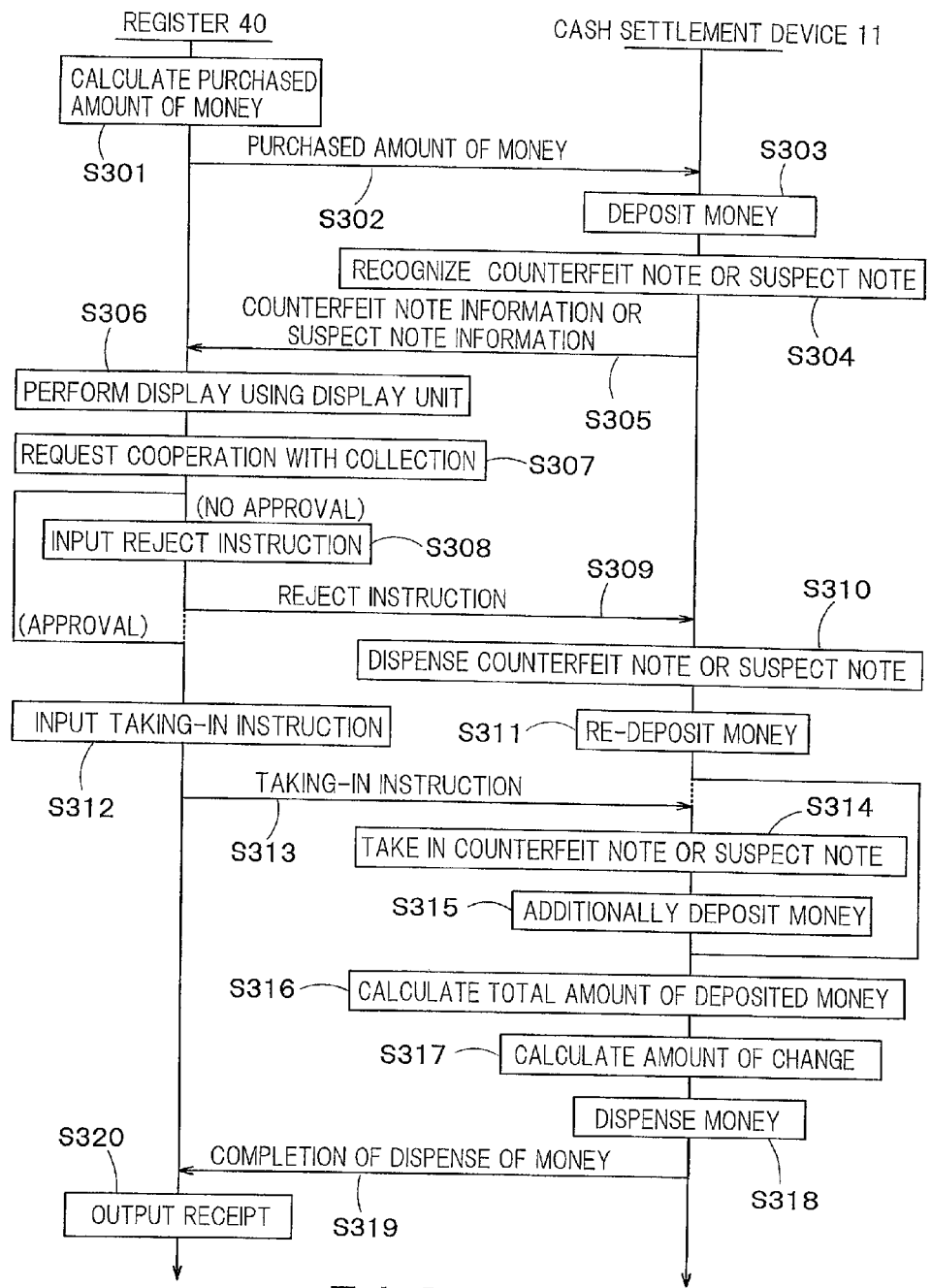
FIG. 12 is a timing diagram that illustrates a settlement method according to the second embodiment.

Next, a case will be described with reference to a timing diagram illustrated in FIG. 12 in which a counterfeit note or a suspect note is included as unacceptable money among the money paid by the customer.

(Step S401)

The product information of a product purchased by a customer is registered in the register 40, and the purchased amount of money is calculated.

(Step S402)

The register 40 transmits the purchased amount of money to the cash settlement device 11.

(Step S403)

Money paid by the customer is inserted into the cash settlement device 11. The insertion of money may be performed by a clerk or the customer himself. The cash settlement device 11 performs a depositing process including the recognizing and counting of the inserted money.

(Step S404)

When the cash settlement device 11 recognizes a counterfeit note or a suspect note, counterfeit note information or suspect note information is generated.

(Step S405)

The cash settlement device 11 transmits the counterfeit note information or the suspect note information to the register 40.

(Step S406)

The counterfeit note information or the suspect note information output to the register 40 is displayed on the display unit 402 of the register 40. In addition, on the display unit 402 of the register 40, a screen for selecting a rejecting operation for the counterfeit note or the suspect note or a taking-in operation for the counterfeit note or the suspect note is displayed.

(Step S407)

In this case, the clerk notifies the customer that the counterfeit note or the suspect note has been detected and requests the customer for cooperation for the collection thereof.

(Step S408)

In a case where it is not an obligation of a retail store to collect the counterfeit note or the suspect note, and the customer rejects the cooperation request, the clerk inputs a reject instruction using the keyboard 404 of the register 40.

(Step S409)

The register 40 transmits the reject instruction to the cash settlement device 11.

(Step S410)

The cash settlement device 11 performs a rejection process for the counterfeit note or the suspect note based on the reject instruction transmitted from the register 40. In other words, the banknote settlement device 12 or the coin settlement device 13 dispenses the counterfeit note or the suspect note from the dispensing unit 120a or the dispensing unit 120b.

(Step S411)

The counterfeit note or the suspect note that has been dispensed is replaced with other money of the customer, and the money after the replacement is re-inserted. At this time, it is preferable that the money after the replacement is re-inserted after the watermark or the like is visually checked by the clerk. The cash settlement device 11 performs a deposit process including recognizing and counting the re-deposited money (here, in a case where a counterfeit note or a suspect note is recognized by the cash settlement device 11 again, the process of Step S404 and subsequent steps is repeated).

(Step S412)

On the other hand, in Step S407, in a case where it is an obligation of a retail store to collect the counterfeit note or the suspect note, or in a case where the customer admits the cooperation request, the clerk inputs a taking-in instruction using the keyboard 404 of the register 40.

(Step S413)

The register 40 transmits the taking-in instruction to the cash settlement device 11.

(Step S414)

The cash settlement device 11 performs a taking-in process for the counterfeit note or the suspect note based on the taking-in instruction transmitted from the register 40.

(Step S415)

Then, money corresponding to an amount that is short by the amount corresponding to the counterfeit note or the suspect note is additionally inserted into the cash settlement device 11. The cash settlement device 11 performs a deposit process including recognizing and counting the additionally inserted money (here, in a case where a counterfeit note or a suspect note is recognized by the cash settlement device 11 again, the process of Step S404 and subsequent steps is repeated).

(Step S416)

Then, the cash settlement device 11 calculates a total amount of money deposited from the customer by using the amount of the inserted money calculated in Step S403 and the amount of the inserted money calculated in Step S411 or S415.

(Step S417)

The cash settlement device 11 calculates the amount of change based on the total amount of the deposited money calculated in Step S416 and the purchased amount of money received from the register 40 in Step S402.

(Step S418)

The cash settlement device 11 dispenses change money based on the amount of the change calculated in Step S417. More specifically, the banknote settlement device 12 dispenses change banknotes from the dispensing unit 120a, and the coin settlement device 13 dispenses change coins from the dispensing unit 120b. The change money may be handed from the clerk to the customer, or the dispensed change money may be directly received by the customer.

(Step S419)

The cash settlement device 11 notifies the register 40 of the completion of dispense of the change money.

(Step S420)

The printer 406 of the register 40 outputs a receipt on which contents of the transaction including the product information of the product purchased by the customer, the purchased amount of money, the amount of money paid by the customer, the amount of the change, and the like are printed. The clerk hands the output receipt to the customer.

It is preferable that the storing unit 150 for storing the counterfeit notes or the suspect notes is specified in advance. In such a case, the counterfeit notes or the suspect notes can be stored separately from fit notes (normal money), and accordingly, only the fit notes can be set as money to be dispensed and be reused.

In a case where a counterfeit note or a suspect note is stored in the storing unit 150, as information representing such an indication, for example, a "deposit receipt" illustrated in FIG. 13 is preferably printed from the printer 406 of the register 40 as a custody certificate. The reason for this is that, in the case of a suspect note, when it is acknowledged as a fit note later, it is necessary to refund a corresponding amount, and there is a possibility that the corresponding amount may be refunded to the customer who accepted the collection of the counterfeit note according to a law.

In addition, in a case where a counterfeit note or a suspect note is stored in the storing unit 150, it is natural that the management device 25 of the back office is notified of information on the taking-in (storage) thereof from the cash settlement device 11. The reason for this is that, in a case where the part of a storing unit 150 in which the counterfeit note or the suspect note is stored is not known, the collection of such a note from the storing unit 150 cannot be smoothly performed thereafter.

Furthermore, in the above-described form described with reference to FIG. 12, it is preferable that the display unit 402 of the register 40 displays a handling method (the procedure of the settlement process and a method of reporting thereof to the police or the like) of a counterfeit note or a suspect note after the detection as well. The reason for this is that, in such a case, the subsequent response of the clerk and/or the customer can be smoothly performed, and the extension of the registration standby time of other customers who are aligned thereafter can be suppressed.

Particularly, it is preferable that the display unit 402 of the register 40 guides the checking of personal identification information of the customer. For example, in a case where the customer is registered as a member of the store, by urging the customer to input a membership number using the keyboard 404, the information of the customer who has admitted to cooperate with the collection of a counterfeit note can be recorded in a speedy manner. The guidance may urge the customer to record credit card information or cash card information or may urge the customer to record a name or the like.

In addition, as illustrated in FIG. 10, in a case where a payment processing unit that processes card payment is disposed in the register 40, for example, in Step S310, S411, and Step S415, an indication representing that card payment of the amount of a difference can be selected instead of re-insertion or additional insertion of money may be displayed on the display unit 402 of the register 40. As a payment method (settlement method) for the amount of the difference, other than that described above, payment using a debit card or the like may be employed.

Furthermore, under a situation in which the collect is obligatory in a retail store, in a case where there is a range of choice for the clerk, there is a concern that a trouble rather occurs. Accordingly, when such an era comes, it may be preferable that counterfeit notes or suspect notes are necessarily taken in the cash settlement device 11. Alternatively, considering that there may substantially be a customer not responding to the collect, it may be preferable that counterfeit notes or suspect notes are set to be necessarily taken in the cash settlement device 11 in a case (customer operated mode) where a clerk is not present in a deposit operation for the cash settlement device 11 and counterfeit notes or suspect notes are set to be able to be rejected to the outside of the device in a case (clerk operated mode) where a clerk is present in a deposit operation for the cash settlement device 11.

In this manner, according to the second embodiment, since the acceptance denial information output from the cash settlement device is displayed on the display unit of the register operated by the clerk, not the customer but the clerk can easily check the acceptance denial information. From this, for the re-settlement process performed thereafter, the clerk can be expected to appropriately urge the customer, and, as a result, the settlement process can be performed in a speedy manner. In a retail store, a time waiting for the register is a factor that is directly related to a store reputation, and accordingly, a speedy settlement process is an extremely important function effect.

In addition, since the acceptance denial information can be easily checked by the clerk, unacceptable money does not necessarily need to be rejected, in other words, for unacceptable money, more flexible handling can be performed.

(Third Embodiment)

In a cash settlement device or a cash accounting device disposed inside a store, in a case where the storing unit is in the state of being full of money or the storing unit is in an empty state, the clerk contacts a CIT (Cash In Transit) company, so that the CIT company collects the money stored in the cash settlement device or the cash accounting device or replenishes the cash settlement device or the cash accounting device with money. Commonly, when a CIT company that collects and replenishes money is determined once, there are many cases where a store continuously requests the CIT company to collect and replenish money. Alternatively, there are many cases where a store requests a CIT company to collect and replenish money by having a contract with the CIT company. In such cases, although another CIT company can actually collect and replenish money less expensively and more quickly than the CIT company, the clerk contacts the CIT company that has been requested to collect and replenish money until then. For example, in a case where a money transport vehicle of another CIT company passes near the store, the another CIT company may collect or replenish money more quickly and less expensively than the CIT company that has been requested to collect and replenish money until then.

On the store side, this leads to problems of raising the cost required for collecting and replenishing money and increasing the time required for collecting and replenishing the money. On the other hand, the CIT company cannot collect money at high efficiency or cannot replenish money at high efficiency. This also leads to a problem of increasing the cost required for collecting and replenishing money on the CIT company side.

According to a cash management system of this embodiment, on the store side requesting to collect or replenish money, the cost required for collecting or replenishing the money is decreased, and the time required therefor can be shortened. In addition, on a transport vendor side collecting or replenishing money, the money can be efficiently collected or replenished at low cost.

FIG. 14 is a conceptual diagram that illustrates the connection relation between a cash management system 1A according to a third embodiment of the present invention and systems of transport vendors A to C. The cash management system 1A is a system that processes and manages money (cash) received from a customer by a clerk and money (cash) paid to a customer from the clerk.

The transport vendors A to C are vendors for transporting money for replenishing the cash management system 1A with money or collecting money from the cash management system 1A. The transport vendors may be parties transporting money to a store or transporting money from the store, and the business form thereof is not particularly limited. Thus, the transport vendor may be a security company, a financial institution, a CIT (Cash In Transit) company, or the like.

The cash management system 1A and each one of the systems of the transport vendors A to C are connected together in a communicable manner through a network. The network may be any network connecting the cash management system 1A and the systems of the transport vendors A to C in a communicable manner and, for example, may be any one of the Internet, an intranet, a LAN (Local Area Network), a telephone line, and the like.

Although the forms of the systems of the transport vendors A to C are not particularly limited, the forms need to configure at least an environment in which information (for example, an electronic mail) transmitted from a store is received, and information can be transmitted to a store.

FIG. 15 is a block diagram that illustrates an example of the configuration of the cash management system 1A. In the cash management system 1A, similarly to the cash management system 1 according to the first embodiment illustrated in FIG. 1, a cash settlement device 11, a cash accounting device 21, a cash management device 25, and a POS management device 26 are arranged.

As illustrated in FIG. 15, in a checkout counter 10, one or a plurality of cash settlement devices 11 performing a settlement process for a customer by depositing or dispensing money are disposed. In the case illustrated in FIG. 15, three cash settlement devices 11 are disposed in the checkout counter 10.

The cash settlement device 11, for example, is connected to a POS register operated by a clerk or a self-checkout register operated by a customer in a communicable manner. The cash settlement device 11 may be configured to be integrated with the POS register or the self-checkout register.

In the back office 20, a cash accounting device 21, a cash management device 25, and a POS management device 26 are disposed. The cash accounting device 21 is connected to the cash settlement device 11 in a communicable manner and, for example, dispenses change fund used for being loaded into the cash settlement device 11 or deposits sales proceeds collected from the cash settlement device 11. The cash management device 25 is connected to the cash settlement device 11 and the cash accounting device 21 in a communicable manner through a LAN or the like. The cash management device 25 manages money stored in the cash settlement device 11 and the cash accounting device 21. For example, the cash management device 25 manages settled money in each cash settlement device 11 and money transmitted and received between the cash settlement device 11 and the cash accounting device 21.

In addition, the cash management device 25 is configured to transmit various kinds of information to the systems of the transport vendors A to C through a network or receive various kinds of information from the systems of the transport vendors A to C.

In the cash management system 1A illustrated in FIG. 15, collection of money from the cash settlement device 11 or replenishment of the cash settlement device 11 with money is performed by the cash accounting device 21. Accordingly, the transport vendors A to C collect money from the cash accounting device 21 or a safe that is disposed separately from the cash management system 1 or replenish the cash accounting device 21 or the safe with money.

The POS management device 26 manages the flow of a product. The flow of a product is not directly related to this embodiment, and thus, here, detailed description of the POS management device 26 will not be presented.

FIG. 16 is a block diagram that illustrates another example of the configuration of the cash management system according to the third embodiment. The cash management system illustrated in FIG. 16 is a system that is used in a relatively small store.

This cash management system is equipped with one cash settlement device 11 and a cash management device 25 that manages the cash settlement device 11. The cash settlement device 11 and the cash management device 25 may have the same configurations as those illustrated in FIG. 15. One or a plurality of the cash settlement devices 11 may be arranged.

In the cash management system illustrated in FIG. 16, the back office 20 is not disposed, and thus, the transport vendors A to C collect money directly from the cash settlement device 11 or a safe that is disposed separately from the cash settlement device 11, or replenish the cash settlement device 11 or the safe with money directly.

In addition, as the form of the cash management system, a form may be considered in which only the cash accounting device 21 is connected to the cash management device 25. In such a case, the transport vendors A to C collect or replenish money from the cash accounting device 21 or the safe.

The external view illustrating an example of each cash settlement device 11 is the same as that illustrated in FIG. 2, and the cash settlement device 11 is equipped with a banknote settlement device 12 and a coin settlement device 13. The coin settlement device 13 performs a settlement process by depositing and dispensing coins. The banknote settlement device 12 performs a settlement process by depositing and dispensing banknotes.

The banknote settlement device 12 includes a housing 100a, a deposit unit 110a, and a dispensing unit 120a (see FIG. 2). The deposit unit 110a is arranged so as to insert banknotes received from customers. The dispensing unit 120a is arranged so as to dispense a change banknote. The coin settlement device 13 includes a housing 100b, a deposit unit 110b, and a dispensing unit 120b. The deposit unit 110b is arranged so as to insert coins received from customers. The dispensing unit 120b is arranged so as to dispense change coins.

Here, in order to distinguish the constituent elements of the banknote settlement device 12 from those of the coin settlement device 13, "a" is attached to a reference sign of each constituent element of the banknote settlement device 12, and "b" is attached to a reference sign of each constituent element of the coin settlement device 13. Here, handling targets of the coin settlement device 13 and the banknote settlement device 12 are different from each other as coins and banknotes, and accordingly, the specific configurations thereof are different each other. However, the coin settlement device 13 and the banknote settlement device 12 may have the same basic block configuration as that illustrated in FIG. 17.

FIG. 17 is a block diagram that illustrates an example of the configuration of the cash settlement device 11. In addition to the deposit unit 110 and the dispensing unit 120, the cash settlement device 11 is further equipped with: a transport unit 130; a recognition unit 140; a storing unit 150; a memory 170; a communication unit 180; and a control unit 190. This cash settlement device 11 has the same configuration as that acquired by omitting the cassette installation unit 160 from the configuration illustrated in FIG. 3. A configuration may be employed in which a cassette installation unit 160 is arranged in the cash settlement device 11.

The transport unit 130 transports money inserted into the deposit unit 110 to the storing unit 150 or transports money dispensed from the dispensing unit 120 from the storing unit 150.

The recognition unit 140 is configured to detect the denomination, the authenticity, the fitness, the old/new type, the quantity, and the like of the money transported by the transport unit 130. For example, the recognition unit 140 is equipped with a sensor such as an imaging sensor or a magnetic sensor.

The storing unit 150 is configured to store money recognized by the recognition unit 140 for each denomination. The storing unit 150 may be a stack-type storing unit that stores each banknote to be overlapped for each denomination or be configured as a plurality of tape reel-type storing units having each banknote to be in a state being interposed between a plurality of tapes for each denomination and winding the tapes together with the banknote.

The memory 170 includes a ROM (Read Only Memory) or a HDD (Hard Disk Drive) that stores various programs and data used for controlling the cash settlement device 11, a RAM (Random Access Memory) that serves as a program loading area or a work area at the time of executing a program, and the like. The memory 170 also stores information (the denomination, the quantity, and the like) of money stored in the storing unit 150 and the cash transport cassette 30. Here, the memory 170 may store the quantity of money recognized by the recognition unit 140 for each denomination.

The communication unit 180 is connected to the other devices (the cash accounting device 21, the cash management device 25, and the POS management device 26) configuring the cash processing system 1A in a communicable manner.

The control unit 190 is an arithmetic processing unit configured to control the whole cash settlement device 11 by executing a program stored in the memory 170.

In this manner, the cash settlement device 11 is configured to store money inserted into the deposit unit 110 in the storing unit 150 and, oppositely, dispense money stored in the storing unit 150 to the dispensing unit 120. In other words, the cash settlement device 11 is configured to reuse inserted money for dispense The cash accounting device 21, similarly to the cash settlement device 11, can store money in the storing unit 150, and is configured to store money inserted into the deposit unit in the storing unit 150 and, oppositely, dispense money stored in the storing unit 150 to the dispensing unit. In other words, the cash accounting device 21, similarly to the cash settlement device 11, is configured to reuse inserted money for dispense. The basic configuration of the cash accounting device 21 is the same as that of the cash settlement device 11, and here, description of the cash accounting device 21 will not be presented.

Figure 18:
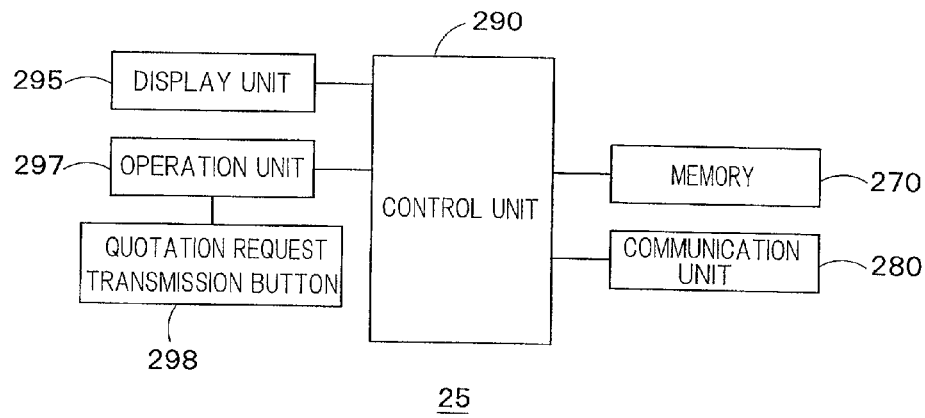
FIG. 18 is a block diagram that illustrates an example of the configuration of the cash management device according to the third embodiment.

FIG. 18 is a block diagram that illustrates an example of the configuration of the cash management device 25. The external view of the cash management device 25 may be the same as that of a general PC (Personal Computer), and here, the external view is not illustrated.

The cash management device 25 is equipped with a memory 270, a communication unit 280, a control unit 290, a display unit 295, and an operation unit 297.

The memory 270 includes a ROM or a HDD that stores various programs and data used for controlling the cash management device 25, a RAM that serves as a program loading area and a work area at the time of executing a program, and the like. The memory 270 also stores information (the denomination, the quantity, and the like) of money stored in the storing unit 150 of the cash settlement device 11.

The memory 270 further stores amount-of-money data management software that manages a total amount of money stored in the cash settlement device 11 and the cash accounting device 21. In a case where money stored in the storing unit 150 needs to be collected or the storing unit 150 needs to be replenished with money, the amount-of-money data management software is configured to transmit a quotation request notification used for requesting for quotation of collecting or replenishing money for the systems of a plurality of transport vendors A to C. In addition, the amount-of-money data management software is configured to transmit a collection/replenishment request notification used for requesting one of the transport vendors A to C that is selected by an operator to collect or replenish money.

The quotation request notification and the collection/replenishment request notification, for example, are electronic mails, and the contents thereof are stored in the memory 270 in advance. The quotation request notification includes information of an address of a store, an email address of the store, the amount of money to be collected or replenished, the denominations, the quantities, and the like. The collection/replenishment request notification may include the same information as that of the quotation request notification or may be a notification representing only a content of a request for collection or replenishment. In a case where the collection/replenishment request notification represents only the content of a request for collection or replenishment, the transport vendor may refer to the information, which is needed for a collection process or a replenishment process, included in the quotation request notification.

In addition, the memory 270 stores information (for example, email addresses and the like) of the plurality of transport vendors A to C in advance. The information of the plurality of transport vendors A to C may be registered in advance by an operator or may be prepared in advance in the initial setting of the amount-of-money data management software installed to the cash management device 25.

The communication unit 280 is connected to the other devices (the cash settlement device 11, the cash accounting device 21, and the POS management device 26) configuring the cash processing system 1A in a communicable manner. In addition, the communication unit 280 also serves as an interface that is communicably connected to the systems of the plurality of transport vendors A to C that manage a total amount of money stored in the storing unit 150 storing money and collect money stored in the storing unit 150 or replenish the storing unit 150 with money.

The control unit 290 is an arithmetic processing unit configured to control the whole cash accounting device 21 by executing a program stored in the memory 270. The control unit 290 is configured to execute the amount-of-money data management software.

The display unit 295 is configured to display various kinds of information such as a total amount of money stored in the cash settlement device 11 and the cash accounting device 21, the states (for example, a near-full state/near-empty state or the like) of the cash settlement device 11 and the cash accounting device 21, information received from the transport vendors A to C, and the like.

The operation unit 297, for example, is a keyboard through which an operator can input various instructions. In the operation unit 297, a quotation request transmission button 298 for transmitting a quotation request notification to the transport vendors A to C is arranged. When an operator presses the quotation request transmission button 298, the cash management device 25 transmits a quotation request notification to the systems of the plurality of transport vendors A to C set in advance as a broadcast mail.

Here, the display unit 295 may be a touch panel-type monitor. In such a case, since the display unit 295 also serves as the operation unit 297, the operator can input various instructions to the cash management device 25 using the display unit 295. The quotation request transmission button 298 may be displayed on the screen of the display unit 295 as the touch panel-type monitor. By operator's touching the quotation request transmission button 298 disposed on the screen of the display unit 295, a quotation request notification can be transmitted to the systems of the transport vendors A to C as a broadcast mail.

Figure 19:
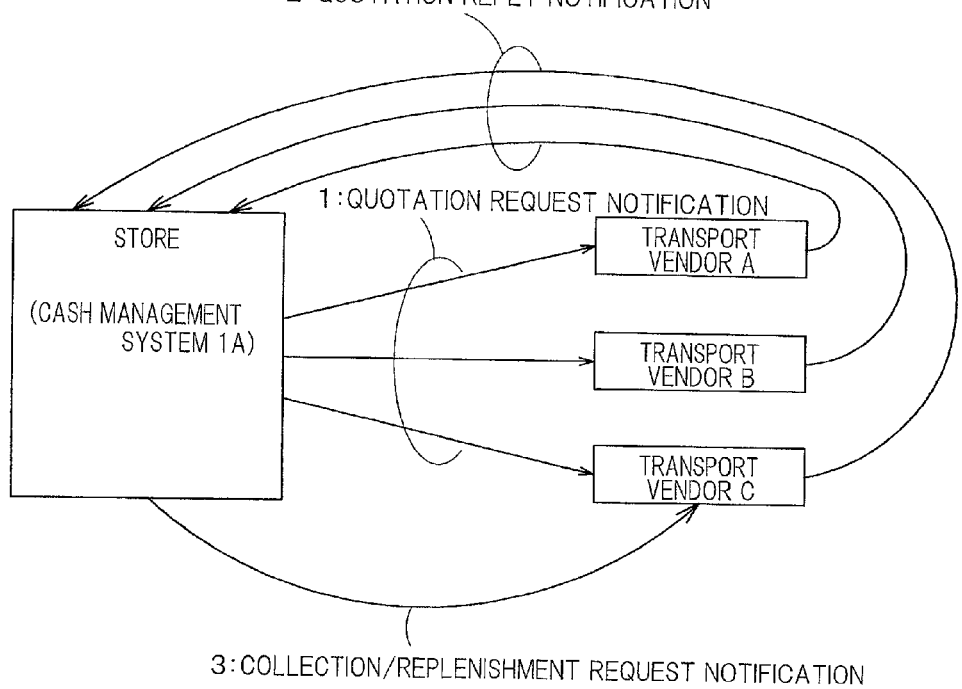
FIG. 19 is a conceptual diagram that illustrates the operation of the cash management system according to the third embodiment.
Figure 20:
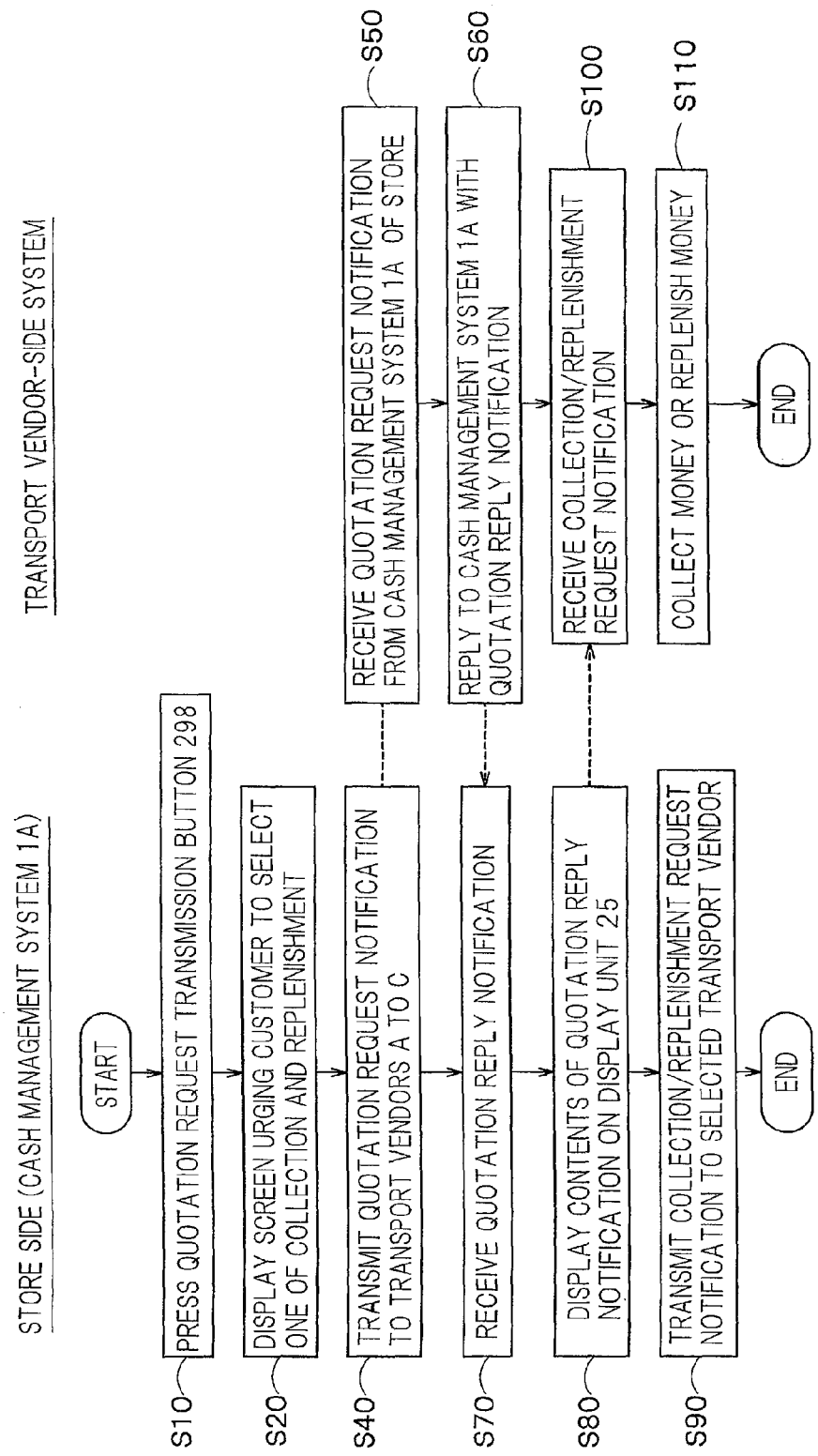
FIG. 20 is a flowchart that illustrates the operation of the cash management system according to the third embodiment.

FIG. 19 is a conceptual diagram that illustrates the operation of the cash management system 1A according to the third embodiment. FIG. 20 is a flowchart that illustrates the operation of the cash management system 1A according to the third embodiment. Hereinafter, as a specific example, the operation of collecting money stored in the cash settlement device 11 illustrated in FIG. 15 or replenishing the cash settlement device 11 with money will be described. Since the operation of collecting money stored in the cash accounting device 21 illustrated in FIG. 15 or the safe or replenishing the cash accounting device 21 or the safe with money can be easily understood from the description presented below, the description thereof will not be presented.

In the cash management system 1A inside a store, in a case where money stored in the storing unit 150 of the cash settlement device 11 decreases to be in a near-empty state, the storing unit 150 needs to be replenished with money.

On the other hand, in a case where the money stored in the storing unit 150 of the cash settlement device 11 increases to be in a near-full state, the money stored in the storing unit 150 needs to be collected. In addition, a total amount of money stored in the storing unit 150 is automatically detected, commonly, by a sensor, a counter (not illustrated in the figure), or the like and is managed by the cash management device 25. The capacity of the storing unit 150 is determined in advance. The display unit 295 displays the capacity of the storing unit 150 and a total amount of money stored in the storing unit 150. Accordingly, by checking the total amount of money stored in the storing unit 150 that is displayed on the display unit 295 of the cash management device 25, the operator can determine a near-full state or a near-empty state.

In a case where the operator checks the total amount of money stored in the storing unit 150 and determines the collection or the replenishment of money to be necessary, the operator presses the quotation request transmission button 298 (S10).

The cash management device 25 displays a screen urging the operator to select one of the collection or the replenishment in accordance with the operation of the quotation request transmission button 298 (S20). The operator selects one of the collection or the replenishment by operating the operation unit 297.

The cash management device 25 automatically transmits a quotation request notification to a plurality of transport vendors A to C stored in the memory 270 (S40) in accordance with the selection of the operator. The quotation request notification, as described above, includes information of an address of a store, an email address of the store, the amount of money to be collected or replenished, the denominations, the quantities, and the like. Since the cash management device 25 manages a total amount of money stored in the storing unit 150 of the cash settlement device 11, the information of the amount of money to be collected or replenished, the denominations, and the quantities can be automatically included in the quotation request notification.

For example, in a case where a request for quotation of collection is made, the control unit 290 of the cash management device 25 subtracts a predetermined number from the total amount of money of the storing unit 150 of the cash settlement device 11. The quantity of money to be collected is set to the result of this subtraction. Here, the predetermined number is the quantity of money (change fund) to be left in the storing unit 150 for being used as change or the like. In the case of a collection process, since the storing unit 150 is in the near-full state, the quantity of the money stored in the storing unit 150 is considered to be more than the predetermined number. Accordingly, by subtracting the predetermined number from the total amount of money stored in the storing unit 150, the cash management device 25 can set the amount of surplus money to be collected with the change fund being left.

On the other hand, in a case where a request for quotation of replenishment is made, the control unit 290 of the cash management device 25 subtracts the total amount of money stored in the storing unit 150 of the cash settlement device 11 from the predetermined number. The quantity of money to be replenished is set to a result of this subtraction. Here, the predetermined number may be the quantity of the change fund. In the case of a replenishment process, since the storing unit 150 is in a near-empty state, the quantity of money stored in the storing unit 150 is considered to be less than the predetermined number. Accordingly, by subtracting the total amount of money stored in the storing unit 150 from the predetermined number, the cash management device 25 can set the amount of lacking money to be replenished so as to reach the change fund. The predetermined number is stored in the memory 270 in advance.

It is apparent that the amount, the denomination, and the quantity of money to be collected or replenished by the operator may be arbitrarily set. In such a case, the amount, the denomination, and the quantity of money to be collected or replenished are input by the operator using the operation unit 297.

Next, when the quotation request notification is received from the cash management system 1A of a store (S50), the systems of the transport vendors A to C reply to the cash management system 1A with a quotation reply notification including at least cost information required for the collection or replenishment of money at that time point and date and time information at which the collection or replenishment of money is performed (S60).

Commonly, the transport vendor manages the location and the traveling route of a transport vehicle transporting money. Accordingly, in a case where the traveling route of a transport vehicle is close to a store that transmits a quotation request notification, a transport vendor having the transport vehicle can collect or replenish the money more quickly and less expensively than the other transport vendors. To the contrary, in a case where the traveling route of any transport vehicle is far from a store that transmits a quotation request notification, the corresponding transport vendor has a higher cost of collection or replenishment of money and more late date and time of the collection or the replenishment of money than the other transport vendors. In addition, a transport vendor developing new customers is considered to set the quotation reply notification so as to collect or replenish money more quickly and less expensively than the other transport vendors.

In addition, for example, in France, there is a restriction that money of a predetermined amount (for example, 30,000 Euro) or more needs to be transported by three or more persons using an armored car as a transport vehicle. In such a case, there are cases where the cost for collecting or replenishing money is different depending on the amount of money loaded in the transport vehicle. It is efficient and economical for a transport vendor to collect or replenish money in a range in which the money loaded in the transport vehicle does not exceed a predetermined amount.

In this manner, the contents of the quotation reply notifications from the transport vendors A to C are different in accordance with various situations of the transport vendors A to C. However, since the situations of the traveling route of the transport vehicle, the type (for example, an armored car or an ordinary car) of the transport vehicle, the number of transporting persons are managed in the system of the transport vendor, it is possible to automatically return the quotation reply notification based on such situations.

It is apparent that an employee of each one of the transport vendors A to C may input the cost and date and time of the collection or replenishment of money based on the above-described situations and transmit a quotation reply notification.

The cash management device 25 disposed on the store side receives quotation reply notifications from the systems of the plurality of transport vendors A to C (S70) and displays the contents of the quotation reply notifications on the display unit 295 (S80). The quotation reply notification includes at least a transport vendor name, information of cost required for collecting or replenishing money and information of date and time at which the money is collected or replenished. Accordingly, the display unit 295 displays the quotation reply notifications of the plurality of transport vendors A to C in the ascending order of the cost required for the collection or replenishment of money or in the order of earlier date and time at which the collection or replenishment of money is performed. From this, the operator can easily select a transport vendor for which the cost is relatively low or a transport vendor for which the date and time for the collection or load is relatively early.

The cash management device 25 may be set in advance so as to automatically select a transport vendor for which the cost is the lowest. In such a case, after the quotation reply notifications are received from the systems of the transport vendors A to C, the cash management device 25 can automatically select a transport vendor for which the cost is the lowest and automatically transmit a collection/replenishment request notification to the selected transport vendor. From this, the effort of the operator for selecting a transport vendor in the cash management device 25 can be omitted.

The cash management device 25 may be set in advance so as to automatically select a transport vendor for which the date and time of the collection or replenishment is earliest. Also in such a case, after the quotation reply notifications are received from the systems of the transport vendors A to C, the cash management device 25 can automatically select a transport vendor for which the cost is the lowest and automatically transmit a collection/replenishment request notification to the selected transport vendor. From this, the effort of the operator for selecting a transport vendor in the cash management device 25 can be omitted.

In a case where the operator manually selects a transport vendor, the operator selects one of transport vendors in accordance with the contents of the quotation reply notifications of the transport vendors A to C on the display unit 295 of the cash management device 25 by operating the operation unit 297. The cash management device 25 transmits a collection/replenishment request notification to the selected transport vendor (S90). In other words, when the operator selects an arbitrary transport vendor by operating the operation unit 297, the cash management device 25 automatically transmits a collection/replenishment request notification stored in the memory 270 in advance to the selected transport vendor. In the example illustrated in FIG. 7, the operator selects the transport vendor C, and the cash management device 25 transmits the collection/replenishment request notification to the transport vendor C. The collection/replenishment request notification is a notification having the content of a request for collection/replenishment as described above. The collection/replenishment request notification includes information of the address of a store at which the money is collected or replenished, the amount of money to be collected or replenished, the denomination, the quantity, and the like.

The system of the transport vendor C receives the collection/replenishment request notification (S100). Then, the transport vendor C collects money stored in the storing unit 150 of the cash settlement device 11 of a store or replenishes the storing unit 150 with money based on the content of the collection/replenishment request notification (S110). The collection/replenishment request notification may not necessarily include information of the address of a store at which the money is collected or replenished, the amount of money to be collected or replenished, the denomination, the quantity, or the like. In such a case, the transport vendor C may collect or replenish money based on the content of the quotation request notification.

In this manner, according to the cash management device 25 of the cash management system 1A of this embodiment, in a case where it is necessary to collect money stored in the storing unit or replenish the storing unit with money, a quotation request notification is transmitted to the systems of the plurality of transport vendors A to C, and quotation reply notifications are received from the transport vendors A to C by a simple operation. Then, the cash management device 25 displays the quotation reply notifications acquired from the systems of the transport vendors A to C on the display unit and transmits a collection/replenishment request notification to the transport vendor selected by the operator.

In this manner, the clerk (client) requesting to collect or replenish money can acquire quotations of a plurality of transport vendors in real time in a simple manner when they are needed and can easily compare quotations of the plurality of transport vendors with each other. As a result, the client can reduce the cost required for collecting or replenishing the money or can have the money collected or replenished in a speedy manner. In this manner, according to the cash management system 1 of this embodiment, the client can select a desired transport vendor.

Meanwhile, the transport vendor can transmit a quotation reply notification based on the situations of the traveling route of a transport vehicle, the amount of money to be collected or replenished, and the like. Accordingly, the transport vendor can efficiently collect the money or efficiently replenish the money. This reduces the cost required for collecting or replenishing the money on the transport vendor side. In addition, this leads to the development of new customers for the transport vendor.

Modified Example of Third Embodiment

The cash management device 25 may automatically detect a near-empty state in a case where the money stored in the storing unit 150 is below a first predetermined value and automatically detect a near-full state in a case where the money stored in the storing unit 150 is above a second predetermined value. The first predetermined value is a value close to an empty state and is a value set in advance for a request for replenishment. The first predetermined value is stored in advance in the memory 170 or 270. In addition, the second predetermined value is a value close to a full state and is a value set in advance for a request for collection. The second predetermined value is stored in the memory 170 or 270 in advance as well.

When a near-empty state or a near-full state is detected, the cash management device 25 automatically transmits a quotation request notification to the systems of a plurality of transport vendors A to C. From this, the cash management device 25 can automatically transmit the quotation request notification without waiting for an operator's decision. The operator does not need to determine a near-full state or a near-empty state and does not need to select collection or replenishment. Accordingly, the quotation request transmission button is not necessary in the cash management device 25, and Steps S10 to S20 illustrated in FIG. 20 do not need to be performed. As a result, the operability of the cash management system 1A is further improved.

(Fourth Embodiment)

Figure 21:
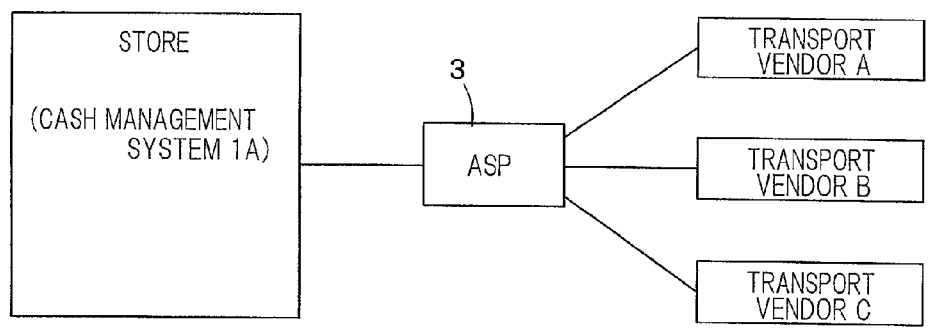
FIG. 21 is a conceptual diagram that illustrates the connection relation between a cash management system according to a fourth embodiment of the present invention and systems of transport vendors A to C.
Figure 22:
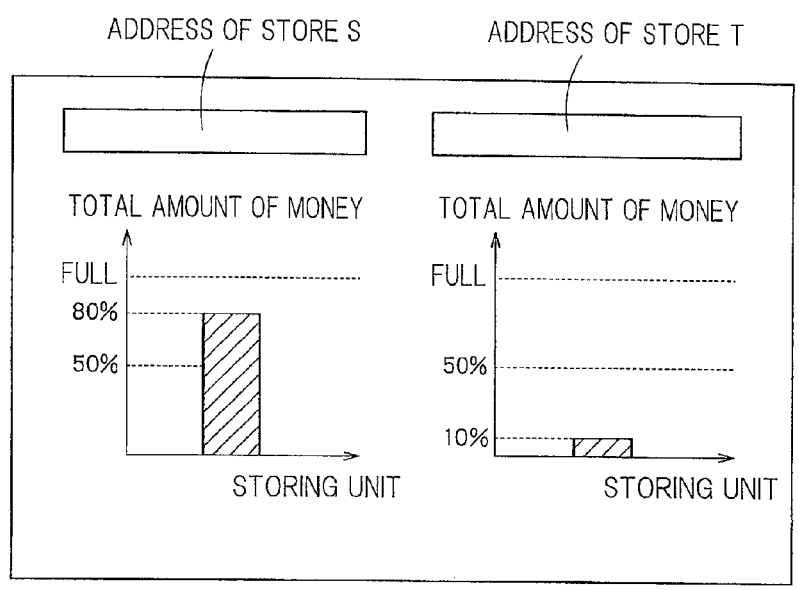
FIG. 22 is a conceptual diagram that illustrates content of total money amount information uploaded to an ASP server.

FIG. 21 is a conceptual diagram that illustrates the connection relation between a cash management system 1A according to a fourth embodiment of the present invention and systems of transport vendors A to C. FIG. 22 is a conceptual diagram that illustrates contents of total money amount information uploaded to an ASP server. FIGS. 23A and 23B are conceptual diagrams that illustrate contents of proposals for collection or replenishment that are uploaded to an ASP server. FIG. 24 is a flowchart that illustrates the operation of the cash management system according to the fourth embodiment. A cash management system 1 according to the fourth embodiment will be described with reference to FIGS. 21 to 24.

As illustrated in FIG. 21, in the fourth embodiment, the cash management system 1A is connected to the systems of transport vendors A to C through an ASP (Application Service Provider) server 3 in a communicable manner. Here, the ASP server is an external server that can be accessed by the cash management system 1A and the transport vendors A to C. A cash management device 25 uploads the information of a total amount of money stored in the storing unit 150 of the cash settlement device 11 to the ASP server 3 and updates the total amount of money at regular intervals (for example, every 20 minutes) (S11).

The transport vendors A to C access the ASP server 3 and check (download) the total amount of money stored in the storing unit 150 of the cash settlement device 11 disposed on a store side in real time (S21). At this time, the transport vendors A to C can acquire information of the address of each store and the total amount of money at each store, as illustrated FIG. 22.

For example, at a store S, it is represented that the total amount of money stored in the storing unit 150 of the cash settlement device 11 is 80% with respect to the full state. In this case, the transport vendors A to C determine that the storing unit 150 is in a near-full state even when a quotation request notification is not received from the store S and upload a proposal for collection to the ASP server (as a quotation reply notification). At a store T, it is understood that the total amount of money stored in the storing unit 150 of the cash settlement device 11 is only 10% with respect to the full state. In this case, the transport vendors A to C determine that, the storing unit 150 is in a near-empty state even when a quotation request notification is not received from the store T and upload a proposal for replenishment to the ASP server (as a quotation reply notification) (S31). The proposal for collection or replenishment, similarly to the quotation reply notification, includes at least information of the cost required for collection or replenishment of money and information of date and time at which the money is collected or replenished.

The transport vendors A to C present proposals for collection or replenishment based on the situations thereof. For example, in a case where the traveling route of a transport vehicle is far from the store S or T, the cost required for collection or replenishment is high, or the date and time at which collection or replenishment is performed is late. In addition, in a case where the amount of money loaded in the transport vehicle exceeds a predetermined amount (for example, 30,000 Euro) and an armored car and three or more persons are necessary when collection is performed, the cost required for the collection is high. On the other hand, in a case where the traveling route of a transport vehicle is close to the store S or T, the cost required for collection or replenishment is low, or the date and time at which collection or replenishment is performed is early. In addition, in a case where the amount of money loaded in the transport vehicle does not exceed the predetermined amount (for example, 30,000 Euro) even when collection is performed, the cost required for the collection is low. In this manner, the proposal for collection or replenishment from each one of the transport vendors A to C differs based on the situation. As described above, the situations of the traveling route of the transport vehicle, the type (for example, an armored car or an ordinary car) of the transport vehicle, the number of transporting persons are managed in the system of the transport vendor. Accordingly, it is possible to automatically upload the proposals for collection or replenishment to the ASP server based on the situations of the transport vendors A to C. In addition, since the situations of the transport vendors A to C change for every predetermined period (for example, every day or every hour), the proposals for collection or replenishment inside the ASP are updated every predetermined period (for example, every 20 minutes) in accordance therewith.

FIG. 23A illustrates a specific example of a proposal for collection. FIG. 23B illustrates a specific example of a proposal for replenishment. The contents of the proposals for collection or replenishment illustrated in FIGS. 23A and 23B are downloaded from the ASP server to the cash management device 25 as the clerk of the store S or T presses the quotation request button disposed in the cash management device 25 (S41) and are displayed on the display unit 295 of the cash management device 25 (S42).

In the proposal for collection illustrated in FIG. 23A, the traveling route of the transport vehicle of the transport vendor A is located near the store S, and the amount of money loaded in the transport vehicle is the predetermined amount or less (for example, 10,000 Euro). Accordingly, the collection cost presented by the transport vendor A is the lowest among the transport vendors A to C and, for example, is 25 Euro.

While the traveling route of the transport vehicle of the transport vendor B is located far from the store S, the amount of money loaded in the transport vehicle is the predetermined amount or less (for example, 10,000 Euro). Accordingly, the collection time presented by the transport vendor B is the latest among the transport vendors A to C and, for example, is 17:40. In addition, the collection cost presented by the transport vendor B is higher than that presented by the transport vendor A and, for example, is 30 Euro. However, the transport vendor B does not require an armored car and three or more persons, and accordingly, the collection cost is lower than that presented by the transport vendor C.

The traveling route of the transport vehicle of the transport vendor C is located near the store S, and the amount of money loaded in the transport vehicle is the predetermined amount or more (for example, 50,000 Euro). From this, the transport vendor C needs to transport the money by three or more persons using an armored car. Accordingly, while the collection time is early, the collection cost presented by the transport vendor C is the highest among the transport vendors A to C and, for example, is 90 Euro.

In the example illustrated in FIG. 23A, the display unit 295 displays proposals for collection in ascending order of the collection cost. A clerk of the store S checks the proposals for collection on the ASP server on the display unit 295 of the cash management device 25. Then, in a case where the transport vendor A of which the collection cost is the lowest is to be selected, the clerk of the store S selects the transport vendor A with a cursor CS using the operation unit 297 (S51). From this, the cash management device 25 automatically transmits the collection request notification stored in the memory 270 in advance to the selected transport vendor A (S61). The collection request notification includes the same information as that of the collection/replenishment request notification described above.

The system of the transport vendor A receives the collection request notification (S71). Then, the transport vendor A collects the money stored in the storing unit 150 of the cash settlement device 11 of the store based on the content of the collection request notification (S81).

In the proposal for replenishment illustrated in FIG. 23B, the traveling route of the transport vehicle of the transport vendor B is located near the store S, and the amount of money loaded in the transport vehicle is the predetermined amount or less (for example, 10,000 Euro). Accordingly, the replenishment time presented by the transport vendor B is the earliest among the transport vendors A to C and, for example, is 09:00. In addition, the replenishment cost presented by the transport vendor B is higher than that presented by the transport vendor A and, for example, is 30 Euro. However, since the transport vendor B does not require an armored car and three or more persons, the replenishment cost thereof is lower than that presented by the transport vendor C.

The traveling route of the transport vehicle of the transport vendor A is located far from the store S, and the amount of money loaded in the transport vehicle is the predetermined amount or more (for example, 50,000 Euro). From this, the transport vendor A needs to transport money using an armored car and three or more persons. Accordingly, the replenishment cost presented by the transport vendor A is the highest among the transport vendors A to C and, for example, is 90 Euro.

The traveling route of the transport vehicle of the transport vendor C is located near the store S, and the amount of money loaded in the transport vehicle is the predetermined amount or less (for example, 10,000 Euro). Since the traveling route of the transport vehicle is located near the store S, the transport vendor C can efficiently replenish the money. Accordingly, the replenishment cost presented by the transport vendor C is the lowest among the transport vendors A to C and, for example, is 25 Euro. However, the replenishment time presented by the transport vendor C is the latest among the transport vendors A to C and, for example, is 15:30.

In the example illustrated in FIG. 23B, the display unit 295 displays proposals for replenishment in the order of earlier replenishment time. A clerk of the store S checks the proposals for replenishment on the ASP server on the display unit 295 of the cash management device 25. Then, in a case where the transport vendor B of which the replenishment time is the earliest is to be selected, the clerk of the store S selects the transport vendor B with a cursor CS using the operation unit 297 (S51). From this, the cash management device 25 automatically transmits the replenishment request notification stored in the memory 270 in advance to the selected transport vendor B (S61). The replenishment request notification includes the same information as that of the collection/replenishment request notification described above.

The system of the transport vendor B receives the replenishment request notification (S71). Then, the transport vendor B replenishes the storing unit 150 of the cash settlement device 11 of the store with money based on the content of the replenishment request notification (S81).

In this manner, the cash management device 25 of the cash management system 1A according to the fourth embodiment uploads the information of the total amount of money stored in the storing unit 150 to the ASP server at regular intervals, and the systems of the transport vendors A to C referring to the information of the total amount of money on the ASP server upload proposals for collection or replenishment to the ASP server as quotation reply notifications. Then, the cash management device 25 receives the proposals for collection or replenishment on the ASP server and displays the contents of the proposals for collection or replenishment on the display unit 295, and the clerk of the store selects one of the transport vendors A to C. From this, the cash management device 25 transmits a collection/replenishment request notification to the selected transport vendor, and the transport vendor collects or replenishes money based on the collection/replenishment request notification.

According to such a cash management system 1A, the transport vendors can check the total amount of money stored on the store side in real time, and the transport vendor side can present proposals for collection or replenishment to the store side. On the other hand, the clerk of the store can acquire proposals for collection or replenishment from a plurality of transport vendors as quotations in real time when the proposals are needed and can compare quotations of the plurality of transport vendors with each other in an easy manner.

As a result, according to the fourth embodiment, the same advantages as those of the third embodiment can be acquired.

The present invention is not limited to the above-described embodiments, and the constituent elements may be modified to be specified in a range not departing from the concept thereof in an implementation step. In addition, various inventions may be formed by appropriately combining a plurality of constituent elements disclosed in the above-described embodiments. For example, several constituent elements may be removed from all the constituent elements represented in each embodiment. In addition, the constituent elements over embodiments different from each other may be appropriately combined.

REFERENCE SIGNS LIST 1 cash management system
2 settlement system
10 checkout counter
11 cash settlement device
12 banknote settlement device
13 coin settlement device
20 back office
21 cash accounting device
25 cash management device
26 POS management device
30 cash transport cassette
40 register

The invention claimed is:

1. A cash management method using a cash management device comprising an interface that is connected to systems of a plurality of transport vendors collecting money stored in a storing unit storing money or replenishing the storing unit with money in a communicable manner and a display unit that displays information, the cash management method comprising:
transmitting a quotation request notification requesting for a quotation of the collection or replenishment of money to the systems of the plurality of transport vendors in a case where it is necessary to collect the money stored in the storing unit or replenish the storing unit with money,
receiving quotation reply notifications including quotation information of the collection or replenishment of money for the quotation request notification from the systems of the plurality of transport vendors,
displaying the quotation reply notifications acquired from the systems of the plurality of transport vendors on the display unit, and
transmitting a collection/replenishment request notification for a request for the collection or replenishment of money to one of the transport vendors selected by an operator of the cash management device.

2. The cash management method according to claim 1, wherein
the cash management device detects a near-empty state representing that the money stored in the storing unit is below a first predetermined value and a near-full state representing that the money stored in the storing unit is above a second predetermined value, and the cash management device transmits the quotation request notification to the systems of the plurality of transport vendors when the near-empty state or the near-full state is detected.

3. The cash management method according to claim 1, wherein
the quotation reply notification includes at least information of the cost required for collecting or replenishing the money or information of date and time at which the collection or replenishment of money is performed.

4. The cash management method according to claim 1, wherein
the display unit displays the quotation reply notifications of the plurality of transport vendors in an ascending order of the cost required for collecting or replenishing money or in an ascending order of date and time at which the collection or replenishment of money is performed.

5. The cash management method according to claim 1, wherein
the quotation request notification includes information of the amount of money to be collected or replenished, denomination information, or quantity information.

6. The cash management method according to claim 1, wherein
the collection/replenishment request notification includes information of the amount of money to be collected or replenished, the denomination information, or the quantity information.

7. The cash management method according to claim 1, wherein
the cash management device further comprises a quotation request transmission button used for determining the transmission of the quotation request notification and a memory unit that stores e-mail addresses of the plurality of transport vendors to which the quotation request notification is transmitted, and as the operator of the cash management device presses the quotation request transmission button, the cash management device automatically transmits electronic mails to the plurality of transport vendors, which are stored in the memory unit, as the quotation request notifications.

8. The cash management method according to claim 7, wherein when the operator of the cash management device selects a certain transport vendor from the plurality of transport vendors displayed on the display unit, the cash management device automatically transmits an electronic mail to the selected transport vendor as the collection/replenishment request notification.

9. The cash management method according to claim 1, wherein
the cash management device is connected to an external server that can be accessed by the plurality of transport vendors in a communicable manner, the cash management device regularly transmits a total amount of money stored in the storing unit to the external server as the quotation request notification and receives quotation reply notifications transmitted from the systems of the transport vendors based on the total amount of money stored in the storing unit that is stored in the external server.

10. A cash management system comprising:
a cash management device that comprises an interface that is connected to systems of a plurality of transport vendors collecting money stored in a storing unit storing money or replenishing the storing unit with money in a communicable manner and a display unit that displays information;
the system of the transport vendor collecting the money stored in the cash management device or replenishing the cash management device with money; and
a network that connects the cash management device and the system of the transport vendor together in a communicable manner, wherein
the cash management device transmits a quotation request notification requesting for a quotation of the collection or replenishment of money to the systems of the transport vendors in a case where it is necessary to collect the money stored in the storing unit or replenish the storing unit with money,
the systems of the plurality of transport vendors receive the quotation request notification and transmit quotation reply notifications including quotation information of the collection or replenishment of money for the quotation request notification to the cash management device,
the cash management device receives the quotation reply notifications from the systems of the transport vendors,
the display unit of the cash management device displays the quotation reply notifications acquired from the systems of the plurality of transport vendors, and
the cash management device transmits a collection/replenishment request notification for a request for the collection or replenishment of money to one of the transport vendors selected by an operator of the cash management device.

11. The cash management system according to claim 10, wherein
the cash management device detects a near-empty state representing that the money stored in the storing unit is below a first predetermined value and a near-full state representing that the money stored in the storing unit is above a second predetermined value, and
the cash management device transmits the quotation request notification to the systems of the plurality of transport vendors when the near-empty state or the near-full state is detected.

12. The cash management system according to claim 10, wherein
the quotation reply notification includes at least information of the cost required for collecting or replenishing the money or information of date and time at which the collection or replenishment of money is performed.

13. The cash management system according to claim 10, wherein
the display unit displays the quotation reply notifications of the plurality of transport vendors in an ascending order of the cost required for collecting or replenishing money or in an ascending order of date and time at which the collection or replenishment of money is performed.

14. The cash management system according to claim 10, wherein
the quotation request notification includes information of the amount of money to be collected or replenished, denomination information, or quantity information.

15. The cash management system according to claim 10, wherein
the cash management system further comprises an external server that is connected to the cash management device in a communicable manner and can be accessed by the plurality of transport vendors, the cash management device regularly transmits a total amount of money stored in the storing unit to the external server as the quotation request notification, the external server stores the total amount of money stored in the storing unit such that the total amount of money stored in the storing unit can be accessed by the plurality of transport vendors, the systems of the transport vendors transmit the quotation reply notifications based on the total amount of money stored in the storing unit that is stored in the external server, and the cash management device receives the quotation reply notifications.

\* \* \* \* \*